(12) United States Patent
Batra et al.

(10) Patent No.: US 11,538,000 B2
(45) Date of Patent: *Dec. 27, 2022

(54) CLOUD COMPUTING PLATFORM, METHOD AND SYSTEM HAVING A PAYMENTS PLATFORM FOR INTEGRATING A SYNCHRONOUS PAYMENT GATEWAY SERVICE WITH THE CLOUD COMPUTING PLATFORM

(71) Applicant: salesforce.com, inc., San Francisco, CA (US)

(72) Inventors: Tarundeep Batra, Union City, CA (US); Manasa Ranjan Tripathy, Telangana (IN); Ravi Shankar, Telangana (IN); Himanshu Kapoor, Telangana (IN); John Banks, Los Altos, CA (US); Pranav Pokharel, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 664 days.

This patent is subject to a terminal disclaimer.

(21) Appl. No.: 16/557,654

(22) Filed: Aug. 30, 2019

(65) Prior Publication Data

US 2021/0065141 A1 Mar. 4, 2021

(51) Int. Cl.
*G06Q 20/02* (2012.01)
*G06F 9/50* (2006.01)
*G06F 11/07* (2006.01)

(52) U.S. Cl.
CPC ......... *G06Q 20/027* (2013.01); *G06F 9/5072* (2013.01); *G06F 11/0766* (2013.01)

(58) Field of Classification Search
CPC ............ G06Q 20/027; G06Q 20/0855; G06Q 20/382; G06Q 20/401; G06Q 20/405;
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

CN 110348832 A * 10/2019

*Primary Examiner* — Zeshan Qayyum
(74) *Attorney, Agent, or Firm* — LKGlobal | Lorenz & Kopf, LLP

(57) ABSTRACT

A cloud-based computing system is provided that includes a payments platform for integrating synchronous payment gateway services with a cloud computing platform so that clients of the cloud computing platform can perform payment transactions with customers via the cloud computing platform. The synchronous payment gateways that include a particular synchronous payment gateway. The cloud computing platform can include a multitenant database system that provides applications and services to a plurality of clients, and a payments platform module. Each client can be, for example, a tenant or organization of the cloud computing platform that transacts business with one or more customers via a synchronous payment gateway. The payments platform module has a pluggable architecture for integrating payment gateway adapters with the cloud computing platform.

15 Claims, 26 Drawing Sheets

(58) Field of Classification Search
CPC .............. G06F 9/5072; G06F 11/0766; G06F 11/3065; G06F 9/547
USPC .......................................................... 705/79
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,922,322 B2 | 3/2018 | Aabye et al. |
| 9,972,005 B2 | 5/2018 | Flurscheim et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0280909 A1* | 11/2010 | Zhang .................. G06Q 20/202 705/17 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |

(56) References Cited

U.S. PATENT DOCUMENTS

| | | |
|---|---|---|
| 2013/0179344 A1 | 7/2013 | Georgoulas et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0325569 A1 | 12/2013 | Holmes et al. |
| 2014/0341217 A1 | 11/2014 | Eisner et al. |
| 2015/0347989 A1* | 12/2015 | Kumar S ............. G06Q 20/027 705/44 |
| 2016/0057619 A1 | 2/2016 | Lopez |
| 2017/0178124 A1 | 6/2017 | Havilio |
| 2018/0121910 A1 | 5/2018 | Hutchison et al. |
| 2018/0315051 A1 | 11/2018 | Hurley et al. |
| 2019/0147515 A1 | 5/2019 | Hurley et al. |

* cited by examiner

```
{
    //adapter SDK which vendors will implement
    //payments platform will invoke this GatewayResponse processRequest(PaymentGatewayContext context);

} global class <namespace>.PaymentGatewayContext
{ global PaymentGatewayRequest getPaymentRequest() {
    } global String getPaymentRequestType() {
    }

} global interface <namespace>.PaymentGatewayResponse
{

} global class <namespace>.GatewayErrorResponse implements
<namespace>.GatewayResponse
{ global GatewayErrorResponse(String errorMessage)
    {
    } global void getErrorMessage()
    {
    }
} global interface <namespace>.PaymentGatewayRequest
{

```
global abstract class <namespace>.AbstractResponse implements GatewayResponse
{
    //This contains setter methods for common gateway response codes global void setGatewayResultCode(String gatewayResultCode){
    } global void setGatewayResultCodeDescription(String gatewayResultCodeDescription){
    } global void setSalesforceResultCode(String salesforceResultCode) {
    } global void setSalesforceReferenceNumber(String salesforceReferenceNumber) {
    } global void setGatewayReferenceNumber(String gatewayReferenceNumber) {
    } global void setGatewayReferenceDetails(String gatewayReferenceDetails) {
    } global void setGatewayDate(Datetime gatewayDate) {
    } global void setAmount(Double amount) {
    } global void setCurrencyIsoCode(String currencyIsoCode) {
    }

```
//The code below represent the pseudo code for an implementation of paymentgateway global class <namespace>.<Name> implements <namespace>.PaymentGatewayAdapter
{
    global <namespace>.GatewayResponse processRequest(<namespace>.paymentGatewayContext gatewayContext)
    {
        //Pseudo Code
        //This shows the steps for an Auth Request
        //Similar implementations can be done for other Transactions //Get request type from gatewayContext
        String requestType = gatewayContext.getPaymentRequestType();

/*
        Validate data and send an error response of type GatewayErrorResponse
        in case there are data validation errors
        */ if (requestType == 'auth') {
            body = buildAuthRequest(((<namespace>.AuthorizationRequest)gatewayContext.getPaymentRequest()));
            HttpResponse res = executeCall(body);
            GatewayResponse response = createAuthResponse(res);
            return response;
        }
        else {
```

FIG. 2D

```
private HttpResponse executeCall(String body)
{
  HttpRequest req = new HttpRequest();
  req.setBody(body);
  req.setHeader('Content-Type', 'application/json');
  req.setHeader('apikey', '{!$Credential.Username}');
  req.setHeader('token', '{!$Credential.Password}');
  //relative URL
  req.setEndpoint('/v1/transactions');
  req.setMethod('POST');
  <namespace>.PaymentsHttp http = new <namespace>.PaymentsHttp();
  HttpResponse res = http.send(req);
  return res;
} private String buildAuthRequest(<namespace>.AuthorizationRequest authRequest)
{
    String requestBody = createRequestBody('authorize', String.ValueOf((authRequest.amount*100).intValue()),
authRequest.currencyIsoCode, authRequest.paymentMethod);
    return requestBody;

} private String createRequestBody(String transactionType, String amount, String currencyIso,
<namespace>.PaymentMethodRequest paymentMethod)
{
    JSONGenerator jsonGeneratorInstance = JSON.createGenerator(true);
    // Write data to the JSON string.

if (<namespace>.CardCategory.CreditCard == paymentMethod.cardPaymentMethod.CardCategory)
    {
      //Write Card Data
    } jsonGeneratorInstance.writeEndObject();
    return jsonGeneratorInstance.getAsString();
} private <namespace>.AbstractResponse createAuthResponse(HttpResponse response)
{
```

FIG. 2D
CONTINUED

```
Map<String, String> mapOfResponseValues = parseResponse(response.getBody());
   <namespace>.AuthorizationResponse authResponse = new <namespace>.AuthorizationResponse();

//populate Auth Response Object
   //Populate Payment Method Response

<namespace>.paymentmethodresponse paymentMethodResponse = new
<namespace>.PaymentMethodResponse();
   paymentMethodResponse.setGatewayToken(mapOfResponseValues.get('value'));
   authResponse.setPaymentMethodResponse(paymentMethodResponse);
   return authResponse;
} private static Map<String, String> parseResponse(String jsonResponse)
{
   Map<String, String> mapOfResponseValuesByKey = new Map<String, String>();
   //parse the json response to key/value pairs return mapOfResponseValuesByKey;
}
```

FIG. 2D
CONTINUED

- Rest Api
  - EndPoint: /commerce/payments/authorizations
  - {

```
"amount": "",
"paymentGatewayId":"",
"paymentMethod": {
  "saveForFutureUse":false,
  "cardPaymentMethod":{
    "cardNumber":"4111111111111111",
    "cardCategory":"CreditCard",
    "cardType":"visa",
  }
}
}
```
340

FIG. 3B

- Sample response format for the above request
- {

```
"error": {
  "code": "",
  "message": ""
},
"gatewayResponse": {
  "gatewayReferenceNumber": "",
  "gatewayResultCode": "",
  "gatewayResultCodeDescription": "",
  "gatewayDate": "",
  "gatewayReferenceDetails": ""
},
"paymentAuthorization": {
  "id": "",
  "amount": "",
  "status": "",
  "salesforceResultCode": "",
  "salesforceReferenceNumber": "",
  "paymentAuthorizationNumber": "",
  "authorizationDate":"",
  "authorizationExpirationDate":""
}
}
```
342

FIG. 3C

- Apex : Sample Apex code to invoke Payment Authorization
  - ConnectApi.PaymentMethodRequest paymentMethodRequest = new ConnectApi.PaymentMethodRequest();
    ConnectApi.CardPaymentMethodRequest cardPaymentMethodRequest = new ConnectApi.CardPaymentMethodRequest();
    cardPaymentMethodRequest.cardNumber = '4111111111111111';
    cardPaymentMethodRequest.expiryYear='2222';
    cardPaymentMethodRequest.expiryMonth='12';
    cardPaymentMethodRequest.cvv='411';
    cardPaymentMethodRequest.cardCategory =ConnectApi.CardCategory.CreditCard;
    cardPaymentMethodRequest.cardType='visa';
    cardPaymentMethodRequest.cardHolderName='John';
    paymentMethodRequest.cardPaymentMethod = cardPaymentMethodRequest;

ConnectApi.AuthorizationRequest authorizationRequest = new ConnectApi.AuthorizationRequest();
authorizationRequest.amount = 1229;
ConnectApi.AuthorizationResponse authorizationResponse = ConnectApi.Payments.authorize(authorizationRequest);

350 (brace for upper block)
352 (brace for lower block)

FIG. 3D

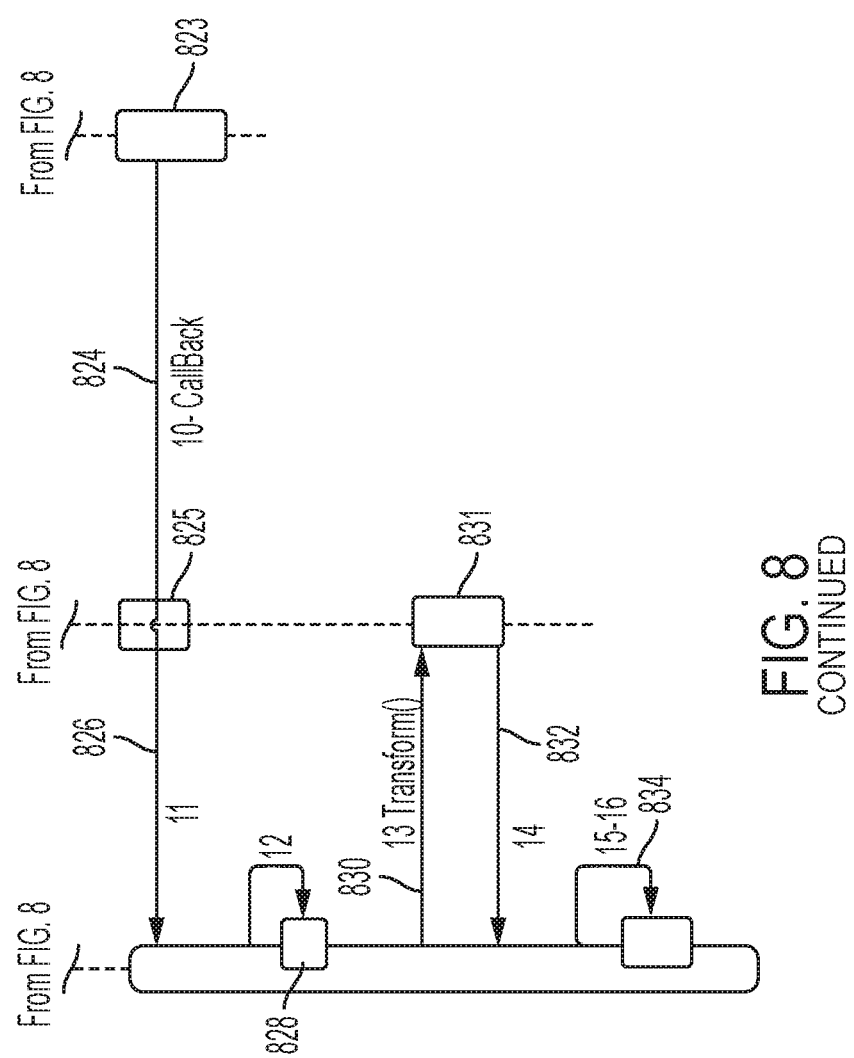

CLOUD COMPUTING PLATFORM, METHOD AND SYSTEM HAVING A PAYMENTS PLATFORM FOR INTEGRATING A SYNCHRONOUS PAYMENT GATEWAY SERVICE WITH THE CLOUD COMPUTING PLATFORM

TECHNICAL FIELD

Embodiments of the subject matter described herein relate generally to cloud computing platforms, and more particularly, embodiments of the subject matter relate to a cloud computing platform that includes a payments platform for integrating synchronous payment gateway services with the cloud computing platform so that clients of the cloud computing platform can perform payment transactions with customers via the cloud computing platform.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

In some cases, a cloud computing platform that provides CRM applications and services may not provide an out-of-the-box native payment solution for its massive client base. Clients can transact business with their customers through payment gateways (i.e., process payments from customers through payment gateways).

One drawback of this approach from the perspective of clients (e.g., vendors, merchants or service providers) of a cloud computing platform is that there are hundreds of application service providers that provide the payment gateway functionality, and each has different APIs. As such, clients may be required to build integrations with each payment gateway that they want to utilize, which is extremely time consuming and difficult to maintain. Another drawback of this approach is that there is no consistent data model used by the various clients (e.g., tenants or organizations) of the cloud computing platform. In other words, data models are not fixed and standardized among tenants, which can make it difficult for client to integrate different payment gateways with the cloud computing platform. Furthermore, a client's transaction data may be spread across many different payment gateways, which can be inconvenient for the client. In addition, there are different types of payment gateways with some being synchronous and others being asynchronous. It can also be difficult for the clients to maintain records of business transactions in the multi-tenant database system, and clients may be forced to acquire data for transactions with a particular customer many different times during the lifecycle of a payment.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2D is an example of how a client will implement API for a specific payment gateway adapter in accordance with the disclosed embodiments.

FIG. 3B shows an input payload structure of a request in accordance with the disclosed embodiments.

FIG. 3C shows an output payload structure of a response in accordance with the disclosed embodiments.

FIG. 3D is an APEX® input payload structure of a request and an APEX® output payload structure of a response in accordance with the disclosed embodiments.

DETAILED DESCRIPTION

Figure 1:
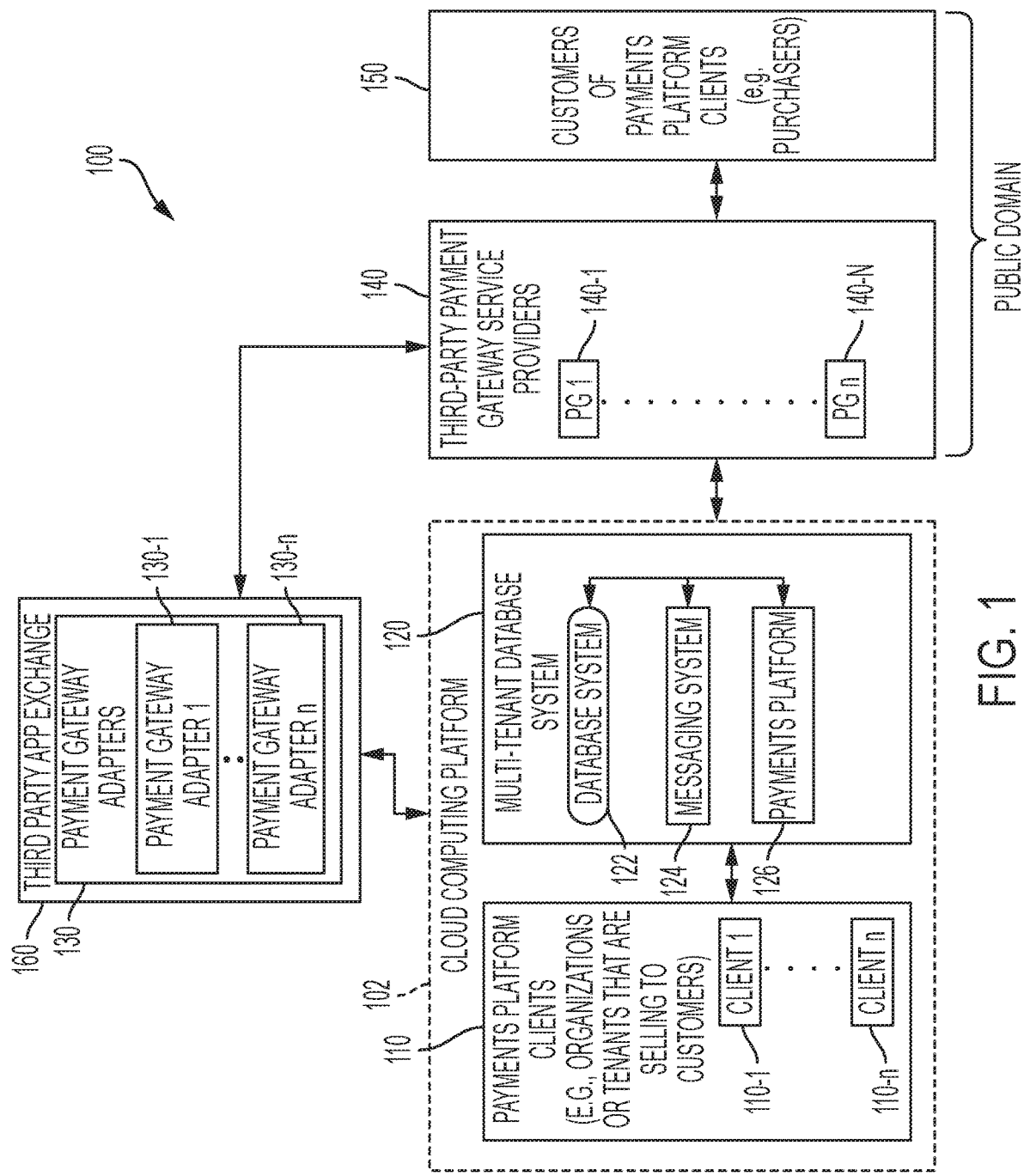
FIG. 1 is a block diagram that illustrates a system in accordance with the disclosed embodiments.

Prior to describing a payments platform for a cloud computing platform in accordance with the disclosed embodiments, a conventional transaction process via a payment gateway will be described. When a customer orders a product from a payment gateway-enabled merchant, the payment gateway performs a variety of tasks to process the transaction. A customer places an order on website by pressing the 'Submit Order' or equivalent button, or perhaps enters their card details using an automatic phone answering service. If the order is via a website, the customer's web browser encrypts the information to be sent between the browser and the merchant's webserver. In between other methods, this may be done via SSL (Secure Socket Layer) encryption. The payment gateway may allow transaction data to be sent directly from the customer's browser to the gateway, bypassing the merchant's systems. This reduces the merchant's Payment Card Industry Data Security Standard (PCI DSS) compliance obligations without redirecting the customer away from the website.

The merchant then forwards the transaction details to their payment gateway. This is another (SSL) encrypted connection to the payment server hosted by the payment gateway. The payment gateway converts the message, for example, from XML to ISO 8583 or a variant message format (format understood by EFT Switches) and then forwards the transaction information to the payment processor used by the merchant's acquiring bank.

The payment processor forwards the transaction information to the card association (e.g., Visa, MasterCard, American Express, etc.). When some types of card associations are used (e.g., an American Express or Discover Card), then the card association also acts as the issuing bank and directly provides a response of approved or declined to the payment gateway. When other types of card associations are used (e.g., a MasterCard or Visa card), the card association routes the transaction to the correct card issuing bank.

The credit card issuing bank receives the authorization request, verifies the credit or debit available and then sends a response back to the processor (via the same process as the request for authorization) with a response code (e.g., approved, denied). In addition to communicating the fate of the authorization request, the response code is also used to define the reason why the transaction failed (e.g., insufficient funds, or bank link not available). Meanwhile, the credit card issuer holds an authorization associated with that merchant and consumer for the approved amount. This can impact the consumer's ability to spend further (e.g., because it reduces the line of credit available or it puts a hold on a portion of the funds in a debit account). The processor then forwards the authorization response to the payment gateway.

The payment gateway receives the response, and forwards it onto the website, or whatever interface was used to process the payment, where it is interpreted as a relevant response, then relayed back to the merchant and cardholder. This is known as the authorization or "Auth." The entire process typically takes 2-3 seconds.

The merchant then fulfills the order and the above process can be repeated, but this time to "clear" the authorization by consummating the transaction. Typically, the "clear" is initiated only after the merchant has fulfilled the transaction (e.g., shipped the order). This results in the issuing bank 'clearing' the 'auth' (e.g., moves auth-hold to a debit) and prepares them to settle with the merchant acquiring bank. In many cases, the merchant submits all their approved authorizations in a "batch" (e.g., at the end of the day) to their acquiring bank for settlement via its processor. This typically reduces or "clears" the corresponding "auth" if it has not been explicitly "cleared."

The acquiring bank makes the batch settlement request of the credit card issuer. The credit card issuer makes a settlement payment to the acquiring bank (e.g., the next day in most cases). The acquiring bank subsequently deposits the total of the approved funds into the merchant's nominated account (e.g., the same day or next day). This could be an account with the acquiring bank if the merchant does their banking with the same bank, or an account with another bank. The entire process from authorization to settlement to funding typically takes 3 days.

It would be desirable to provide a cloud computing platform, that provides clients with CRM applications and services, with a native payment platform that lets different clouds and client applications (e.g., Order Management System, Ecommerce Storefronts, Salesforce.org, Quotes to Cash, etc.) interact with different payment gateways based on customer needs. For example, it would be desirable for the payment gateways to be able to integrate their services with the cloud computing platform so that clients can transact business within the cloud computing platform.

Having given that background information, the disclosed embodiments can provide a cloud computing platform that includes a payments platform for integrating payment gateway services with the cloud computing platform so that clients of the cloud computing platform can perform payment transactions with customers via the cloud computing platform.

In one embodiment, a cloud-based computing system is provided. The cloud-based computing system can include a plurality of payment gateways that include a particular payment gateway, and a cloud computing platform. Each payment gateway is an application service provider that provides a payment gateway adapter configured for different payment gateway functionality. The payment gateway adapters include a particular payment gateway adapter provided by the particular payment gateway. The cloud computing platform can include a multitenant database system and a payments platform module. The multitenant database system is configurable to provide applications and services to a plurality of clients. Each client can be, for example, a tenant or organization of the cloud computing platform that transacts business with one or more customers via a payment gateway. The payments platform module has a pluggable architecture for integrating each of the payment gateway adapters of the plurality of payment gateways with the cloud computing platform so that the clients and customers of clients are able to perform payment transactions using the payment gateways via the payments platform module of the cloud computing platform. In one embodiment, the payment transactions supported by the payments platform module comprise one or more of: an authorization transaction that includes an authorization request and an authorization response, an authorization reversal transaction that includes an authorization reversal request and an authorization reversal response, a capture transaction that includes a capture request and a capture response, a sale transaction that includes a sale request and a sale response, a void transaction that includes a void request and a void response, and a refund transaction that includes a refund request and a refund response.

In one embodiment, the cloud-based computing system can also include a third-party application exchange configured to store a plurality of payment gateway adapters. Each of the payment gateway adapters is customized for a particular one of the payment gateways, and is pluggable into the payments platform module so that each of the clients can selectively integrate which payment gateway adapters to implement. Each of the payment gateway adapters can be written in a custom programming language of the cloud-based computing platform using standardized application programming interfaces provided by the payments platform module of the cloud computing platform such that the payment gateway adapters are pluggable into payments platform module. The payment gateway adapters can be published via the third-party application exchange by their corresponding payment gateway as a managed package that is accessible to the clients so that clients can selectively install and instantiate different payment gateway adapters for each particular payment gateway that is selected for integration by that client. Each of the payment gateway adapters are selectable by any of the clients for integration with the payments platform module to allow the clients to select any of the payment gateways to execute payment transactions with their customers through the payments platform module using the particular payment gateways that are selected. Each of the payment gateway adapters, when executed by the hardware-based processing system, is configurable to cause: receiving and processing payment transaction requests from clients by calling a particular payment gateway adapter specified in each the payment transaction request; and processing and returning payment transaction responses that originate from one of the payment gateways.

In one embodiment, the payments platform module exposes: payment gateway client application programming interfaces to clients to call from flows, process builders, customer code, wherein the payment gateway client application programming interfaces are a unified set of application programming interfaces that clients can use to interact with the various different payment gateways; and payment gateway adapter application programming interfaces of the payment gateway adapters for each of payment gateways. The payment gateway adapter application programming interfaces are universal for all clients and allow developers of the payment gateways to build payment gateway adapters such that each payment gateway can use the payment gateway client application programming interfaces to integrate with the payments platform module and implement payment gateway adapter application programming interfaces. The payment gateway adapter application programming interfaces are written in a custom programming language (e.g., APEX®) of the cloud-based computing platform. Each of the clients can use the payment gateway client application programming interfaces to consume the payment gateway adapter application programming interfaces. In one embodiment, the payments platform module includes a payment gateway integration layer that allows the payments platform module to interact with the payment gateways by exposing payment gateway adapter application programming interfaces to interact with each of the payment gateways. The payment gateway adapter application programming interfaces serve as bridge for interaction between the payment gateway integration layer and the payment gateway adapters. The payment gateway integration layer coordinates calls between the payments platform module and the payment gateways, and when executed by the hardware-based processing system, is configurable to cause receiving and processing payment transaction requests from clients by calling a particular payment gateway adapter specified in each the payment transaction request, wherein each payment transaction request comprises information regarding which payment gateway adapter to use so that payments platform module knows which payment gateway adapter to call and invoke; and processing and returning payment transaction responses that have been translated by and forwarded from the payment gateway adapters, wherein the payment transaction responses originate from one of the payment gateways.

In one embodiment, the payment gateway integration layer, when executed by the hardware-based processing system, is configurable to cause: initializing and loading, based on a configuration specified in a payment transaction request, a specific environment for the particular payment gateway adapter; converting the payment transaction request to a specific format for the particular payment gateway adapter; calling and executing the particular payment gateway adapter; receiving and converting a payment transaction response that is specific to the particular payment gateway into a gateway payment transaction response that is specific to the payments platform module; and returning the gateway payment transaction response.

In one embodiment, the payments platform module, when executed by the hardware-based processing system, is configurable to cause: executing the particular payment gateway adapter that has been selected by a particular client to implement a set of payment gateway adapter application programming interfaces so that application programming interfaces of the particular payment gateway can be translated into the payment gateway client application programming interfaces the cloud computing platform, wherein the particular payment gateway adapter translates application programming interfaces of a particular payment gateway into the application programming interfaces of the cloud computing platform so that they are compatible.

In one embodiment, a cloud-based computing system is provided that includes a multitenant database system that hosts a plurality of clients that each transact business with one or more customers via a payment gateway. The cloud-based computing system comprises at least one hardware-based processor and memory. The memory comprises processor-executable instructions encoded on a non-transient processor-readable media. The processor-executable instructions, when executed by the processor, are configurable to cause: selecting a particular payment gateway adapter for a particular payment gateway, wherein the particular payment gateway is one of a plurality of payment gateways, wherein each payment gateway is an application service provider that provides a payment gateway adapter configured for different payment gateway functionality; and executing, at a payments platform module of a cloud computing platform, particular payment gateway adapter so that a client and one or more customers of client are able to perform payment transactions using the particular payment gateway via the payments platform of the cloud computing platform.

In one embodiment, the processor-executable instructions, when executed by the processor, are further configurable to cause: storing, at a third-party application exchange, a plurality of payment gateway adapters each being customized for a particular one of the payment gateways, wherein each of the payment gateway adapters are pluggable into the payments platform module so that each of the clients can selectively integrate which payment gateway adapters to implement, wherein the payment gateway adapters include the particular payment gateway adapter, and wherein the payments platform module has a pluggable architecture for integrating each of the payment gateway adapters with the cloud computing platform so that the clients and customers of clients are able to perform payment transactions using the payment gateways via the payments platform.

In one embodiment, the cloud-based computing system according to claim 14, wherein the payment gateway adapters are published via the third-party application exchange by their corresponding payment gateway as a managed package that is accessible to the clients so that clients can selectively install and instantiate different payment gateway adapters for each particular payment gateway that is selected for integration by that client, and wherein each of the payment gateway adapters is written in a custom programming language of the cloud-based computing platform using standardized application programming interfaces provided by the payments platform module of the cloud computing platform such that the payment gateway adapters are pluggable into payments platform module.

In one embodiment, the payments platform module exposes: payment gateway client application programming interfaces to clients to call from flows, process builders, customer code, wherein the payment gateway client application programming interfaces are a unified set of application programming interfaces that clients can use to interact with the various different payment gateways; and payment gateway adapter application programming interfaces of the payment gateway adapters for each of payment gateways, wherein the payment gateway adapter application programming interfaces are universal for all clients and allow developers of the payment gateways to build payment gateway adapters such that each payment gateway can use the payment gateway client application programming interfaces to integrate with the payments platform module and implement payment gateway adapter application programming interfaces. The payment gateway adapter application programming interfaces are written in a custom programming language of the cloud-based computing platform. Each of the clients can use the payment gateway client application programming interfaces to consume the payment gateway adapter application programming interfaces. The payments platform module can also include a payment gateway integration layer that allows the payments platform module to interact with the payment gateways by exposing payment gateway adapter application programming interfaces to interact with each of the payment gateways, wherein the payment gateway adapter application programming interfaces serve as bridge for interaction between the payment gateway integration layer and the payment gateway adapters.

Each of the payment gateway adapters are selectable by any of the clients for integration with the payments platform module to allow the clients to select any of the payment gateways to execute payment transactions with their customers through the payments platform module using the particular payment gateways that are selected. The processor-executable instructions, when executed by the processor, are further configurable to cause: receiving and processing payment transaction requests from clients by calling a particular payment gateway adapter specified in each the payment transaction request; and processing and returning payment transaction responses that originate from one of the payment gateways.

In one embodiment, the payment gateway integration layer coordinates calls between the payments platform module and the payment gateways. The payment gateway integration layer, when executed by the hardware-based processing system, is configurable to cause: receiving and processing payment transaction requests from clients by calling a particular payment gateway adapter specified in each the payment transaction request, wherein each payment transaction request comprises information regarding which payment gateway adapter to use so that payments platform module knows which payment gateway adapter to call and invoke; and processing and returning payment transaction responses that have been translated by and forwarded from the payment gateway adapters, wherein the payment transaction responses originate from one of the payment gateways.

In one embodiment, the payment gateway integration layer, when executed by the hardware-based processing system, is configurable to cause: initializing and loading, based on a configuration specified in a payment transaction request, a specific environment for the particular payment gateway adapter; converting the payment transaction request to a specific format for the particular payment gateway adapter; calling and executing the particular payment gateway adapter; receiving and converting a payment transaction response that is specific to the particular payment gateway into a gateway payment transaction response that is specific to the payments platform; and returning the gateway payment transaction response.

In one embodiment, the payments platform module, when executed by the hardware-based processing system, is configurable to cause: executing the particular payment gateway adapter that has been selected by a particular client to implement a set of payment gateway adapter application programming interfaces so that application programming interfaces of the particular payment gateway can be translated into the payment gateway client application programming interfaces the cloud computing platform, wherein the particular payment gateway adapter translates application programming interfaces of a particular payment gateway into the application programming interfaces of the cloud computing platform so that they are compatible.

In one embodiment, a payment transaction method is provided for integrating payment gateways with a cloud computing platform so that clients of the cloud computing platform can perform payment transactions with customers using the payment gateways via the cloud computing platform. The payment transaction method comprises: receiving, at a payments platform, a payment request from a particular client of the clients of the cloud computing platform; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; performing internal processing at the payments platform and calling the payment gateway via the particular payment gateway adapter to send the transformed payment request to the payment gateway; receiving the transformed payment request at the particular payment gateway; processing the transformed payment request at the particular payment gateway to generate an actual payment response and sending the actual payment response from the particular payment gateway to the payments platform; forwarding the actual payment response from the payments platform to the particular payment gateway adapter; transforming, at the particular payment gateway adapter, the actual payment response into a specific format used by the payments platform to generate a transformed payment response; and sending the transformed payment response from the payment gateway adapter to the payments platform; and persisting, via the payments platform, data from the transformed payment response in a payment record at a database system of the cloud computing platform, wherein the data is persisted in a pending state.

In one embodiment, after persisting the data, the method can include sending an appropriate response to the particular client from the payments platform that includes an indication of whether the transformed payment response was successful or unsuccessful. In one embodiment, prior to initializing and calling the particular payment gateway adapter, the method can include validating the payment request at the payments platform to determine whether the payment request is valid.

In one embodiment when the payments platform determines that the payment request is valid, the method can include validating, at a payment gateway integration layer, a specific configuration of the particular payment gateway to determine whether the specific configuration is valid. In this case, the particular payment gateway adapter is initialized and called when the payment gateway integration layer determines that the specific configuration of the particular payment gateway is valid.

In one embodiment, when the payments platform determines that the payment request is not valid, or when the payment gateway integration layer determines that the specific configuration of the particular payment gateway is not valid, the method can include generating, at the payments platform, an appropriate error response; and sending the appropriate error response to the particular client, wherein the appropriate error response indicates either: why the payment request was not valid or why the specific configuration of the payment gateway was not valid. In one embodiment, the method can include validating, at the particular payment gateway adapter, request data from the payment request to determine whether the request data is valid. In this case, the particular payment gateway adapter transforms the payment request into the gateway specific format of the particular payment gateway when the particular payment gateway adapter determines that the request data from the payment request is valid.

In one embodiment, when the particular payment gateway adapter determines that the request data from the payment request is not valid, the method can include sending, from the particular payment gateway adapter to the payments platform, a response that indicates that the request data from the payment request is not valid; determining at the payments platform whether a gateway call was successful; and sending an appropriate response to the particular client from the payments platform that includes an indication of that the transformed payment response was successful or unsuccessful. In one embodiment, the method can include generating, at the payments platform when the gateway call was determined to be unsuccessful, an appropriate error response; and sending the appropriate error response to the particular client, wherein the appropriate error response indicates why the gateway call was not successful. In one embodiment, after sending the transformed payment request to the payments platform, the method can include creating, at the payments platform, a payment gateway log record that comprises: gateway log details including data from the transformed payment request and a payment gateway ID.

In one embodiment, after receiving the transformed payment response at the payments platform, the method can include evaluating the transformed payment response at the payments platform to determine whether the transformed payment response was successful or unsuccessful; creating a payment record having a status of processed when the transformed payment response was determined to be successful; and responding back to the client with at least gateway log details and payment record details. In one embodiment, the the payment record includes financial details related to a payment, comprising: an amount of the payment, details regarding a payment method, payment type, transaction date, and an identifier for the particular payment gateway that was used to make the payment. In one embodiment, the particular payment gateway is a particular synchronous payment gateway that processes the payment request synchronously by: processing the request to generate the actual payment response and then sending the actual payment response to the payments platform during the same interaction such that the actual payment response is deterministic. In one embodiment, a system is provided that includes at least one hardware-based processor and memory. The memory comprises processor-executable instructions encoded on a non-transient processor-readable media. The processor-executable instructions, when executed by the at least one hardware-based processor, are configurable to cause: receiving, at a payments platform, a payment request from a particular client of a plurality of clients of a cloud computing platform; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; performing internal processing at the payments platform and calling the payment gateway via the particular payment gateway adapter to send the transformed payment request to the payment gateway; receiving the transformed payment request at the particular payment gateway; processing the transformed payment request at the particular payment gateway to generate an actual payment response and sending the actual payment response from the particular payment gateway to the payments platform; forwarding the actual payment response from the payments platform to the particular payment gateway adapter; transforming, at the particular payment gateway adapter, the actual payment response into a specific format used by the payments platform to generate a transformed payment response; and sending the transformed payment response from the payment gateway adapter to the payments platform; and persisting, via the payments platform, data from the transformed payment response in a payment record at a database system of the cloud computing platform.

In one embodiment, the processor-executable instructions, when executed by the at least one hardware-based processor, are further configurable to cause: validating, at the particular payment gateway adapter, request data from the payment request to determine whether the request data is valid. In this embodiment, the particular payment gateway adapter can transform the payment request into the gateway specific format of the particular payment gateway when the particular payment gateway adapter determines that the request data from the payment request is valid. When the particular payment gateway adapter determines that the request data from the payment request is not valid: the particular payment gateway adapter can send the payments platform, a response that indicates that the request data from the payment request is not valid, and the payments platform can determine whether a gateway call was successful. The payments platform can send an appropriate response to the particular client that includes an indication of that the transformed payment response was successful or unsuccessful. The payment record can include financial details related to a payment, comprising: an amount of the payment, details regarding a payment method, payment type, transaction date, and an identifier for the particular payment gateway that was used to make the payment. In this embodiment, the particular payment gateway is a particular synchronous payment gateway that processes the payment request synchronously by: processing the request to generate the actual payment response and then sending the actual payment response to the payments platform during the same interaction such that the actual payment response is deterministic.

In one embodiment, a cloud-based computing system is provided that includes a plurality of payment gateways comprising a particular payment gateway, and a cloud computing platform. The cloud computing platform can include a multitenant database system that is configurable to provide applications and services to a plurality of clients, wherein each client is a tenant or organization of the cloud computing platform; and a payments platform for integrating the payment gateways with the cloud computing platform so that the clients can perform payment transactions with customers using the payment gateways via the cloud computing platform. The payments platform, when executed by a first hardware-based processing system, is configurable to cause: receiving a payment request from a particular client of the plurality of clients; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; and performing internal processing at the payments platform and calling the payment gateway via the particular payment gateway adapter to send the transformed payment request to the payment gateway. The particular payment gateway, when executed by a second hardware-based processing system, is configurable to cause receiving the transformed payment request; processing the transformed payment request to generate an actual payment response and sending the actual payment response to the payments platform. The payments platform, when executed by the first hardware-based processing system, is further configurable to cause: forwarding the actual payment response to the particular payment gateway adapter; transforming, at the particular payment gateway adapter, the actual payment response into a specific format used by the payments platform to generate a transformed payment response; and sending the transformed payment response from the payment gateway adapter to the payments platform; and persisting data from the transformed payment response in a payment record at the multitenant database system of the cloud computing platform. In one embodiment, the particular payment gateway is a particular synchronous payment gateway that processes the payment request synchronously by: processing the request to generate the actual payment response and then sending the actual payment response to the payments platform during the same interaction such that the actual payment response is deterministic.

In one embodiment, a payment transaction method is provided for integrating payment gateways with a cloud computing platform so that clients of the cloud computing platform can perform payment transactions with customers using the payment gateways via the cloud computing platform. The payment transaction method can include receiving, at a payments platform, a payment request from a particular client of the clients of the cloud computing platform; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; performing internal processing at the payments platform and calling the payment gateway via the particular payment gateway adapter to send the transformed payment request to the payment gateway; receiving the transformed payment request at the particular payment gateway in a first interaction; sending an acknowledgement response from the particular payment gateway to the particular payment gateway adapter, wherein the acknowledgement response indicates that the transformed payment request has been received; and forwarding the acknowledgement response to the payments platform. After a delay period: the transformed payment request can be processed at the particular payment gateway to generate an actual payment response. The actual payment response can be sent from the particular payment gateway to the payments platform; forwarding the actual payment response from the payments platform to the particular payment gateway adapter. The actual payment response is sent in a different interaction than the first interaction. The particular payment gateway adapter can transform the actual payment response into a specific format used by the payments platform to generate a transformed payment response. The transformed payment response from the payment gateway adapter can be sent to the payments platform. Based on the transformed payment response, the payments platform can determine that the particular payment gateway is an asynchronous payment gateway. The payments platform can persist data from the transformed payment response in a payment record at a database system of the cloud computing platform. The data is persisted in a pending state in which the particular payment gateway has acknowledged the transformed payment request without determining whether payment was successful. In one embodiment, after persisting the data: the method can include sending an appropriate response to the particular client indirectly from the payments platform that includes an indication of whether the transformed payment response was successful or unsuccessful. In one embodiment, prior to initializing and calling the particular payment gateway adapter: the method can include validating the payment request at the payments platform to determine whether the payment request is valid.

In one embodiment, when the payments platform determines that the payment request is valid, the method can include validating, at a payment gateway integration layer, a specific configuration of the particular payment gateway to determine whether the specific configuration is valid. In this embodiment, the particular payment gateway adapter can be initialized and called when the payment gateway integration layer determines that the specific configuration of the particular payment gateway is valid. In one embodiment, when the payments platform determines that the payment request is not valid, or when the payment gateway integration layer determines that the specific configuration of the particular payment gateway is not valid, the method can include generating, at the payments platform, an appropriate error response; and sending the appropriate error response to the particular client, wherein the appropriate error response indicates either: why the payment request was not valid or why the specific configuration of the payment gateway was not valid.

In one embodiment, the method can include validating, at the particular payment gateway adapter, request data from the payment request to determine whether the request data is valid. In this embodiment, the particular payment gateway adapter can transform the payment request into the gateway specific format of the particular payment gateway when the particular payment gateway adapter determines that the request data from the payment request is valid. In one embodiment, when the particular payment gateway adapter determines that the request data from the payment request is not valid: the method can include sending, from the particular payment gateway adapter to the payments platform, a response that indicates that the request data from the payment request is not valid; determining at the payments platform, based on the transformed payment response, that the particular payment gateway is a synchronous payment gateway; determining at the payments platform whether a gateway call was successful; updating, via the payments platform, a pending state to processed when the payments platform determines that the gateway call was successful; and sending an appropriate response indirectly to the particular client from the payments platform that includes an indication of that the transformed payment response was successful or unsuccessful. In one embodiment, the method can include updating, via the payments platform, a pending state to failed when the payments platform determines that the gateway call was not successful; generating, at the payments platform, an appropriate error response; and sending the appropriate error response to the particular client, wherein the appropriate error response indicates why the gateway call was not successful. In one embodiment, after sending the transformed payment request to the payments platform, the method can include creating, at the payments platform, a payment gateway log record that comprises: data from the transformed payment request and a payment gateway ID.

In one embodiment, after processing the transformed payment request at the particular payment gateway to generate the actual payment response, the method can include calling back, from the payment gateway, to an endpoint at the particular payment gateway adapter; calling, via the payment gateway adapter, a recording API from the payments platform to process the actual payment response received from the particular payment gateway; and creating, at the payments platform, a new payment gateway log record that will be linked back to the payment gateway log record, wherein the new payment gateway log record comprises: a cleansed request response string, normalized data, and various reference codes to track the payment from the particular payment gateway to an issuing bank.

In one embodiment, after receiving the transformed payment response at the payments platform, the method can include evaluating the transformed payment response at the payments platform to determine whether the transformed payment response was successful or unsuccessful; updating a payment record and a status of the payment record, wherein the updating is based on whether the transformed payment response was determined to be successful or unsuccessful; and publishing an event notification, wherein the event notification that is published is based on whether the transformed payment response was determined to be successful or unsuccessful.

In one embodiment, at run-time, the payments platform does not have configuration information that indicates whether the particular payment gateway is synchronous or asynchronous. The payments platform processes the transformed payment response from the particular payment gateway adapter, during run-time, to determine if the particular payment gateway is synchronous or asynchronous. In one embodiment, the particular payment gateway is asynchronous payment gateway that processes the payment request asynchronously such that the actual payment response is not deterministic, and sends the actual payment response to the payments platform during another separate interaction that is different than the first interaction. The delay period is between the particular payment gateway receiving the payment request in the first interaction.

In one embodiment, a system is provided comprising at least one hardware-based processor and memory. The memory comprises processor-executable instructions encoded on a non-transient processor-readable media. The processor-executable instructions, when executed by the at least one hardware-based processor, are configurable to cause: receiving, at a payments platform, a payment request from a particular client of a plurality of clients of a cloud computing platform; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; performing internal processing at the payments platform and calling the payment gateway via the particular payment gateway adapter to send the transformed payment request to the payment gateway; receiving the transformed payment request at the particular payment gateway in a first interaction; sending an acknowledgement response from the payment gateway to the particular payment gateway adapter, wherein the acknowledgement response indicates that the transformed payment request has been received; and forwarding the acknowledgement response to the payments platform. After a delay period: the particular payment gateway can process the transformed payment request to generate an actual payment response and sending the actual payment response from the particular payment gateway to the payments platform, and forward the actual payment response from the payments platform to the particular payment gateway adapter. The actual payment response is sent in a different interaction than the first interaction. The particular payment gateway adapter can transform the actual payment response into a specific format used by the payments platform to generate a transformed payment response, and send the transformed payment response from the payment gateway adapter to the payments platform. The payments platform can determine, based on the transformed payment response, that the particular payment gateway is an asynchronous payment gateway. The payments platform can persist data from the transformed payment response in a payment record at a database system of the cloud computing platform. The data is persisted in a pending state in which the particular payment gateway has acknowledged the transformed payment request without determining whether payment was successful.

The processor-executable instructions, when executed by the at least one hardware-based processor, are further configurable to cause: validating, at the particular payment gateway adapter, request data from the payment request to determine whether the request data is valid. In this embodiment, the particular payment gateway adapter transforms the payment request into the gateway specific format of the particular payment gateway when the particular payment gateway adapter determines that the request data from the payment request is valid. When the particular payment gateway adapter determines that the request data from the payment request is not valid, the particular payment gateway adapter can send the payments platform a response that indicates that the request data from the payment request is not valid.

Based on the transformed payment response, the payments platform can determine that the particular payment gateway is a synchronous payment gateway. The payments platform can determine whether a gateway call was successful, and if so, can update a pending state to processed when the payments platform determines that the gateway call was successful, and send an appropriate response to the particular client from the payments platform that includes an indication that the transformed payment response was successful or unsuccessful.

In one embodiment, at run-time, the payments platform does not have configuration information that indicates whether the particular payment gateway is synchronous or asynchronous. In this embodiment, the payments platform processes the transformed payment response from the particular payment gateway adapter, during run-time, to determine if the particular payment gateway is synchronous or asynchronous. When the particular payment gateway is asynchronous payment gateway, it processes the payment request asynchronously such that the actual payment response is not deterministic. The delay period is between the particular payment gateway receiving the payment request in the first interaction and then sending the actual payment response to the payments platform during another separate interaction that is different than the first interaction.

In one embodiment, a cloud-based computing system is provided that hosts a plurality of clients. The cloud-based computing system includes a plurality of payment gateways comprising a particular payment gateway, and a cloud computing platform. The cloud computing platform includes a multitenant database system that is configurable to provide applications and services to the plurality of clients, and a payments platform for integrating the payment gateways with the cloud computing platform so that the clients can perform payment transactions with customers using the payment gateways via the cloud computing platform. The payments platform, when executed by a first hardware-based processing system, is configurable to cause: receiving a payment request from a particular client of the plurality of clients; initializing and calling a particular payment gateway adapter of a plurality of payment gateway adapters to send the payment request to the particular payment gateway adapter, wherein the particular payment gateway adapter corresponds to a particular payment gateway of a plurality of payment gateways; transforming, at the particular payment gateway adapter, the payment request into a gateway specific format of the particular payment gateway to generate a transformed payment request; performing internal processing at the payments platform and calling the payment gateway via the particular payment gateway adapter to send the transformed payment request to the payment gateway. The particular payment gateway, when executed by a second hardware-based processing system, is configurable to cause: receiving the transformed payment request in a first interaction; sending an acknowledgement response to the particular payment gateway adapter, wherein the acknowledgement response indicates that the transformed payment request has been received; and after a delay period, processing the transformed payment request at the particular payment gateway to generate an actual payment response and sending the actual payment response from the particular payment gateway to the payments platform; forwarding the actual payment response from the payments platform to the particular payment gateway adapter, wherein the actual payment response is sent in a different interaction than the first interaction. The payments platform, when executed by the first hardware-based processing system, is further configurable to cause: transforming, at the particular payment gateway adapter, the actual payment response into a specific format used by the payments platform to generate a transformed payment response; and sending the transformed payment response from the payment gateway adapter to the payments platform; determining, based on the transformed payment response, that the particular payment gateway is an asynchronous payment gateway; and persisting data from the transformed payment response in a payment record at the multitenant database system of the cloud computing platform. The data is persisted in a pending state in which the particular payment gateway has acknowledged the transformed payment request without determining whether payment was successful.

In one embodiment, at run-time, the payments platform does not have configuration information that indicates whether the particular payment gateway is synchronous or asynchronous. The payments platform processes the transformed payment response from the particular payment gateway adapter, during run-time, to determine if the particular payment gateway is synchronous or asynchronous. In one embodiment, the particular payment gateway is asynchronous payment gateway that processes the payment request asynchronously such that the actual payment response is not deterministic. The delay period is between the particular payment gateway receiving the payment request in the first interaction and then sending the actual payment response to the payments platform during another separate interaction that is different than the first interaction.

FIG. 1 is a block diagram that illustrates a cloud-based computing system 100 in accordance with the disclosed embodiments. The cloud-based computing system 100 includes a cloud computing platform 102 (e.g., Salesforce.com), which is part of the cloud-based computing system 100 but may also be referred to as a cloud-based computing system, payment gateways (PGs) 140, customers 150, and a third-party application exchange 160. The cloud computing platform 102 includes clients 110 of a payments platform (PP) 126 and a multi-tenant database system 120. The multi-tenant database system 120 includes a database system 122, a messaging system 124, and a payments platform 126. The payments platform 126 can also be referred to herein as a payments platform module 126. Although it is illustrated as being part of the multi-tenant database system 120 in this embodiment, it should be appreciated that the payments platform 126 can also be implemented within the cloud computing platform 102 separately from the multi-tenant database system 120. As will be explained in greater detail below, the system 100 is loosely coupled and provides pluggable architecture that allows numerous payment gateways 140-1 . . . 140-N to create their own payment gateway adapters 130-1 . . . 130-N, publish the payment gateway adapters 130-1 . . . 130-N at the third-party application exchange 160, and plug their respective payment gateway adapters 130-1 . . . 130-N into the payments platform 126. Clients 110 can then choose which payment gateway adapters 130-1 . . . 130-N they want to implement.

The clients 110 can include any number of clients 110-1 through 110-N, where N is any number greater than or equal to 2. Each of the clients 110 can be an organization or tenant of the cloud computing platform 102 that is transacting business with customers 150. Organizations and tenants are described in greater detail below with reference to FIGS. 9 through 12. The clients 110 can be, for example, vendors of products, goods or services who want to transact business with the customers 150 by selling them their products, goods or services. Customers 150 can make payments to clients 110 using common payment methods such as credit cards, direct debit cards, gift cards (e.g., based on money or currency), rewards cards (e.g., based on points), Automated Clearing House (ACH) payments, digital wallets, mobile wallets, etc., as well custom payment methods.

Examples of database systems in accordance with the disclosed embodiments will be described below with reference to FIGS. 9-12. Among other things, the database system 122 can store data from various payment transactions as records. How this data is passed into the database system 122 depends on the processing mode that the payments platform 126 is operating in. As will be described in greater detail below with reference to FIGS. 4A through 4C, the payments platform 126 can support two different processing modes that will be referred to herein as "external mode" and "internal mode" or "Salesforce® mode." The external processing mode (also referred to herein as "external mode") will be described with reference to FIGS. 4A and 4B, while the internal processing mode (also referred to herein as "internal mode" or "Salesforce® mode") will be described with reference to FIG. 4C.

In one embodiment, the messaging system 124 can be a communications platform as a service (CPaaS). A communications platform as a service (CPaaS) is a cloud-based delivery model that allows organizations to add real-time communication capabilities, such as voice, video and messaging, to business applications by deploying application program interfaces (APIs). The communication capabilities delivered by APIs can include Short Message Service (SMS), Multimedia Messaging Service (MMS), telephony and video. Communication services can be embedded into business applications, such as sales software, to add features such as notifications, click-to-call and multifactor authentication. In other words, CPaaS can be deployed by organizations that want to embed communications in their business applications, as well as cloud service providers and developers looking to add communications capabilities to their applications and services. The platforms include standards-based APIs, comprehensive software developer's kits, and APEX®, JAVA® or other libraries for building applications on various platforms.

APEX® is a proprietary language developed by Salesforce.com® that allows clients 110 of Salesforce.com® clients to deliver additional functionality on top of Salesforce.com® platform. APEX® is a strongly typed, object-oriented programming language that allows developers to execute flow and transaction control statements on Salesforce® servers in conjunction with calls to the API. Using syntax that looks like JAVA® and acts like database stored procedures, APEX® enables developers to add business logic to most system events, including button clicks, related record updates, and Visualforce pages. APEX® code can be initiated by Web service requests and from triggers on objects. APEX® provides built-in support for common Lightning® Platform idioms, including: data manipulation language (DML) calls, such as INSERT, UPDATE, and DELETE, that include built-in DmlException handling; inline Salesforce Object Query Language (SOQL) and Salesforce Object Search Language (SOSL) queries that return lists of sObject records; looping that allows for bulk processing of multiple records at a time; locking syntax that prevents record update conflicts; custom public API calls that can be built from stored APEX® methods; warnings and errors issued when a user tries to edit or delete a custom object or field that is referenced by APEX®. APEX® is based on familiar JAVA® idioms, such as variable and expression syntax, block and conditional statement syntax, loop syntax, object and array notation. Where APEX® introduces new elements, it uses syntax and semantics that are easy to understand and encourage efficient use of the Lightning Platform. Therefore, APEX® produces code that is both succinct and easy to write. APEX® is designed to thread together multiple query and DML statements into a single unit of work on the Salesforce server. Developers use database stored procedures to thread together multiple transaction statements on a database server in a similar way. Like other database stored procedures, APEX® does not attempt to provide general support for rendering elements in the user interface. APEX® is a strongly typed language in that it uses direct references to schema objects such as object and field names. It fails quickly at compile time if any references are invalid. It stores all custom field, object, and class dependencies in metadata to ensure that they are not deleted while required by active APEX® code. APEX® can be interpreted, executed, and controlled entirely by the Lightning Platform. Like the rest of the Lightning® Platform, APEX® runs in a multitenant environment. So, the APEX® runtime engine is designed to guard closely against runaway code, preventing it from monopolizing shared resources. Any code that violates limits fails with easy-to-understand error messages. APEX® provides built-in support for unit test creation and execution. It includes test results that indicate how much code is covered, and which parts of your code could be more efficient. Salesforce ensures that all custom APEX® code works as expected by executing all unit tests prior to any platform upgrades. APEX® code can be saved against different versions of the API.

The payments platform 126 can seamlessly provide an out of the box integration with hundreds or even thousands of payment gateways 130 by exposing an APEX® payment gateway adapter API 216 that is provided by the cloud computing platform 102. The payments platform 126 provides a single unified flavor of standard APIs like (authorization, authorization reversal, capture, sale, void, refund, etc.) over all payment gateways 140-1 . . . 140-N thus abstracting the complex implementation details of how they are exposed via different API signatures of different payment gateway 140-1 . . . 140-N providers like PAYPAL®, STRIPE®, CYBERSOURCE®, ADVEN®, WORLDPAY®, SECUREPAY.COM®, AUTHORIZE.NET®, 2CHECKOUT.COM®, AMAZON PAYMENTS®, FIRST DATA CORPORATION®, BLUEPAY PROCESSING LLC, PAYSIMPLE®, FASTCHARGE.COM®, PAYNOVA®, CHRONOPAY®, SQUARE®, etc.

This can allow any one of the clients 110 to transact business through the payments platform 126 with one or more of their customers using any payment gateway 140. The payments platform 126 will be described in greater detail with reference to FIGS. 2 through 8.

The payment gateway service providers 140 (also referred to herein simply as "payment gateways") can include a plurality of payment gateways 140-1 through 140-N, where N is any number greater than or equal to 1. For example, there are hundreds or even thousands of application service providers that provide different payment gateway functionality.

As used herein, the term "payment gateway" can refer a merchant service provided by an e-commerce application service provider that authorizes credit card or direct payments processing for e-businesses, online retailers, bricks and clicks, or traditional brick and mortar. The payment gateway may be provided by a bank to its client, but can be also provided as a separate service by a specialized financial service provider, such as a payment service provider. A payment gateway facilitates a payment transaction by the transfer of information between a payment portal (such as a website, mobile phone or interactive voice response service) and the front-end processor or acquiring bank. A payment gateway can, for example, facilitate communication between banks and help a merchant collect payments from a purchaser. It should be noted that a payment gateway differs from a payments processor in that a payment gateway is an intermediary between an online vendor and a payment processor that validates and then shares a transaction request to the payment processor, whereas a payment processor processes the payment request from the payment gateway and executes it (e.g., debits the money from the customer account and deposits it in a merchant account and then notifies the payment gateway about the transaction status (success or failed)).

Although not illustrated, the customers 150 can include any number of customers who transact business with clients 110 of the payments platform 126. In accordance with the disclosed embodiments, any one of the customers can transact business with one or more of the clients 110 through the payment gateways 140-1 through 140-N and/or the payments platform 126. The customers can be, for example, purchasers of goods or services that are offered for sale by the client 110. As shown in FIG. 1, the payment gateway 140 and customers 150 are entities that are in the public domain outside the cloud computing platform 102. Depending on the particular implementation, the third-party application exchange 160 can also be an entity that is in the public domain, or in the alternative, can be an entity that is part of the cloud computing platform 102.

As shown in FIG. 1, the third-party application exchange 160 is an online, cloud-based, enterprise application marketplace in which applications and components are customized for the cloud computing platform 102. Applications can be written in APEX® programming language. The third-party application exchange 160 can allow providers for each payment gateway 140-1 . . . 140-N to use a standardized APEX® APIs (provided by the payments platform 126 of the cloud computing platform 102) to write their own managed package code for a payment gateway adapter for their payment gateway in APEX®. This way, the payment gateways 140-1 . . . 140-N can use the APEX® payment APIs to write their managed package code to plug into payment platform. Each payment gateway 140-1 through 140-N can create or build a payment gateway adapter (PGA) 130 for that payment gateway. Thus, each instance of payment gateway adapter 130 is built by one of the payment gateways 140. With this architecture, each of the payment gateways 140 can manage branding and versioning of their payment gateway adapters, and the third-party application exchange 160 can manage versioning and licensing of all payment gateway adapters. After a payment gateway 140 creates one of the payment gateway adapters 130, that payment gateway 140 can publish it as a managed package via the third-party application exchange 160. A managed package is a container used by clients 110 of Salesforce.com® to distribute and sell applications. A managed package is a container that can include an individual component or a set of related apps. After creating a managed package, it can be distributed to other Salesforce.com® users and organizations. An organization can create a single managed package that can be downloaded and installed by many different organizations. Managed packages differ from unmanaged packages by having some locked components, allowing the managed package to be upgraded later. Unmanaged packages do not include locked components and cannot be upgraded.

The third-party application exchange 160 can then provide clients 110 with access to the various payment gateway adapters 130-1 . . . 130-N (for each payment gateway 140-1 . . . 140-N) so that they can install them and instantiate different payment gateway adapters for each particular payment gateway they desire to use.

The client organizations can then install the payment gateway adapters 130. For example, in one embodiment, administrators of client 110 organizations can use a payment gateway entity, which has nested named credentials, and create an instance of any payment gateway adapters 130 for any payment gateways 140 that they want to implement. Administrators of client organizations can get the gateway credentials for their organization and save it securely in the payment gateway entity. Based on payment method type, regions and other business rules, a business logic layer can determine which payment gateway to use.

Figure 2A:
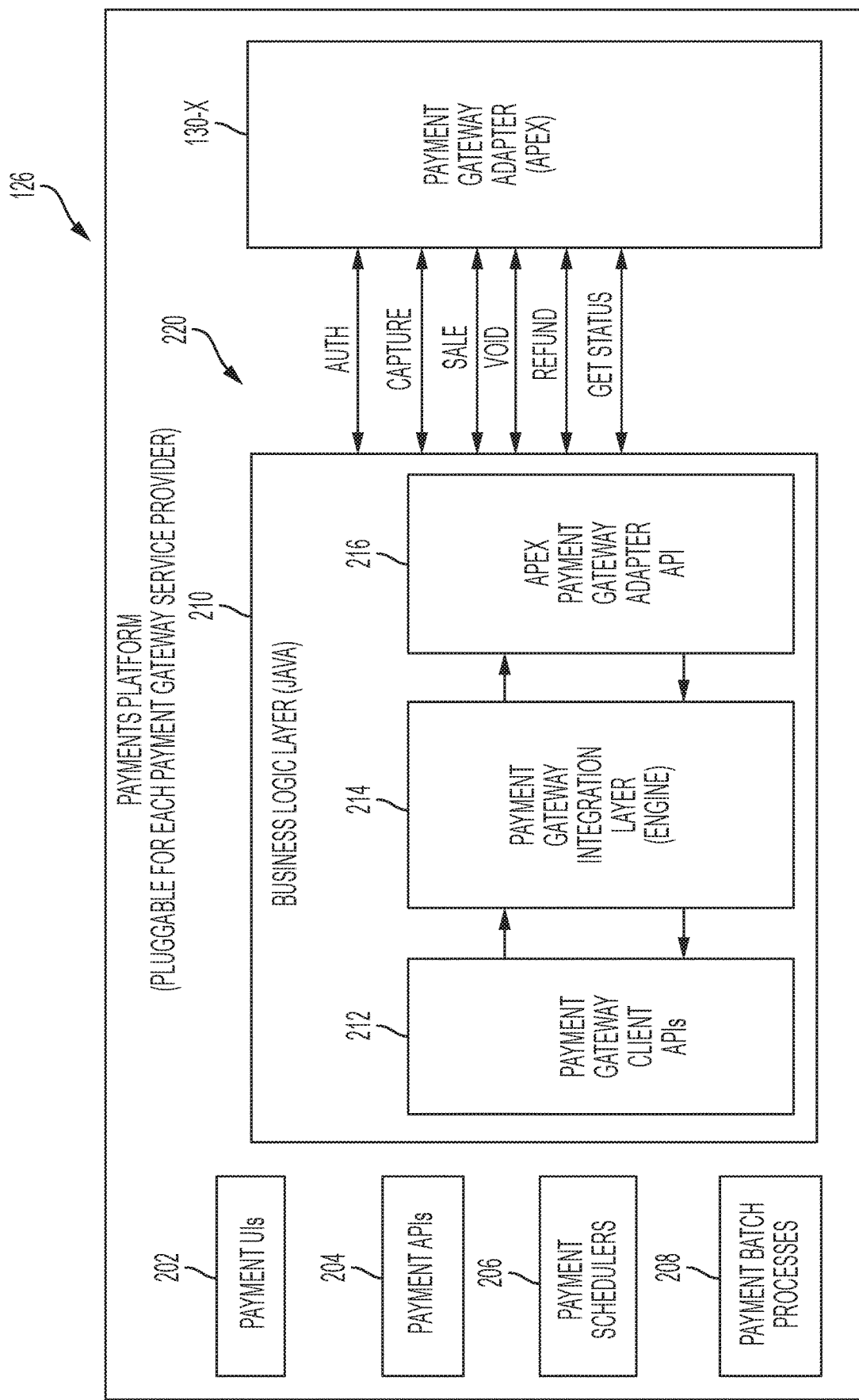
FIG. 2A is a block diagram that illustrates one example of a payments platform in accordance with the disclosed embodiments.

A payment gateway adapter 130 and the payments platform 126 will now be described in greater detail with reference to FIGS. 2A through 8. FIG. 2A is a block diagram that illustrates one example of a payments platform 126 in accordance with the disclosed embodiments. FIG. 2A illustrates how various elements of the payments platform 126 interact with a particular instance of a payment gateway adapter 130-X from the third-party application exchange 160 that has been installed at the payments platform 126 of FIG. 1. The payments platform 126 includes payment user interfaces (UIs) 202, payment APIs 204, payment schedulers 206, payment batch processes 208, and a business logic layer 210. It should be appreciated that this example of the payments platform 126 that is shown in FIG. 2A is non-limiting, and that the payments platform 126 can also include other components that help the clients integrate with payments platform 126.

The payment user interfaces (UIs) 202 are user interfaces that interact with the Payment APIs 204 and carry out the payment transactions as described herein. The payment APIs 204 are can include REpresentational State Transfer (REST) and APEX® APIs to be used by clients 110 to provide a programmatic way of interacting with the payments platform 126 (e.g., to carry out payment transactions and collect money). For instance, a client 110 can use Payment APIs 204 to collect money from a PAYPAL® account of a customer 150 when that customer 150 places order.

The payment schedulers 206 are schedulers used by clients 110 to automate payment transactions as described herein. The payment schedulers 206 can be used, for example, for subscription and recurring payments. The payment batch processes 208 are processes that process payment transactions in groups or batches without user interaction.

The business logic layer 210 acts as an orchestrator and manages coordination of interconnections and interactions between the cloud computing platform 102 and the payment gateway adapters 130. In one embodiment, the business logic layer 210 is written in JAVA®. The business logic layer 210 includes payment gateway client APIs 212, a payment gateway integration layer (PGIL) 214, and an APEX® payment gateway adapter APIs 216.

The payments platform 126 exposes payment gateway client APIs 212 to clients 110. The payment gateway client APIs 212 are a unified set of APIs that clients 110 (e.g., ISVs/Partners) can use to build integration and interact with the various different payment gateways 140. For example, PAYPAL® could use the payment gateway client APIs 212 to integrate with the payments platform 126 and can implement payment gateway adapter APIs 216, while the clients 110 can use the payment gateway client APIs 212 to consume this. Clients 110 are free to choose from different types of APIs such as REST/SOAP/APEX® without understanding how payment gateway client APIs 212 work and in which specific type. For example, payment gateway client APIs 212 can include REST/SOAP/APEX® APIs that can be exposed to the clients 110 to call from flows, process builders, customer code, etc., whereas the APEX® payment gateway adapter APIs 216 are APEX® APIs. For instance, a client 110 can use a REST APIs for a sale call even though underneath the cover the payment provider supports SOAP APIs. This provides a huge advantage because clients 110 of the payments platform 126 do not have to understand and interact with multiple APIs for different payment gateways 140.

The payment gateway integration layer 214 abstracts the rest of the payments platform 126 so that it can interact with the various payment gateways 140 by exposing APIs of the cloud computing platform 102 to interact with the various payment gateways 140. For example, in one embodiment, the payment gateway integration layer 214 exposes APEX® payment gateway adapter APIs 216 to interact with the various payment gateways 140. However, in other embodiments, the payment gateway integration layer 214 may expose other APIs to interact with the various payment gateways 140 (e.g., APIs written in any other language or APIs used by other platforms such as MULESOFT®, AMAZON WEB SERVICES® (AWS®), etc.). In other embodiments, the payment gateway integration layer 214 may expose other APIs to interact with any other Platform as a Service (PaaS) layer such as AWS®, AZURE®, etc., or any integration service such as MULESOFT®, INFORMATICA®, DELL BOOMI®, etc.

At a high-level, the payment gateway integration layer 214 receive a request from a client 110 (e.g., a payment request JAVA® Object that represents the request payload of the client), and returns a response that a particular payment adapter 130 sends to the payments platform 126 (e.g., gateway response JAVA® Object that represents a response that a payment adapter 130 sends to the payments platform 126). As used herein a "request" can refer to a HTTP request received from a client for any type of payment transaction or operation including those described above with reference to FIG. 3A. The request includes information re: which payment gateway adapter 130 to use so that payments platform 126 knows which payment gateway adapter 130 to call and invoke. The payment gateway integration layer 214 coordinates calls between the payments platform 126 and the payment gateway services 140. The payment gateway integration layer 214 processes requests and calls a particular payment gateway adapter 130 specified in each the request. Once the payment gateway adapter 130 gets a response back, it forwards that response to the payment gateway integration layer 214 of the payments platform 126. As used herein a "response" can refer to a HTTP response received from a payment gateway that has been translated by a payment adapter for any type of payment transaction or operation including those described above with reference to FIG. 3A.

Depending on the implementation, the payment gateway integration layer 214 also performs a number of functions. For example, the payment gateway integration layer 214 can also initialize an adapter specific environment, convert the payment request to appropriate adapter specific format, call the adapter, convert the adapter specific response to payment platform specific response (or "gateway response"), return the response, etc. For instance, in one implementation, the payment gateway integration layer 214 can also initialize and load an APEX® adapter class based on the configuration provided in the payment request, convert the payment request to appropriate APEX® API specific format, execute the APEX® adapter, receive the APEX® response, and convert the APEX® response to gateway response and return the response. In addition, other adapters, such as MULESOFT® or AWS® adapters, may perform similar steps specific to those environments.

Independent Software Vendors (ISVs) can selectively integrate any of the APEX® payment gateway adapter APIs 216 with the payments platform 126 so that the payments platform 126 can be scaled to support multiple payment gateways 140. The payments platform 126 insulates both the clients 110 from the payment gateways 140 and the payment gateways 140 from the business logic. To explain further, the payments platform 126 provides (or "exposes") a corresponding set of APEX® payment gateway adapter APIs 216 for each of the different payment transactions/operations 220 shown in FIG. 2A. Each of the different payment transactions/operations 220 shown in FIG. 2A will be described in greater detail below with reference to FIG. 3A. The APEX® payment gateway adapter APIs 216 serve as bridge between the APEX® payment gateway integration layer 214 and the payment gateway adapter 130-X. The APEX® payment gateway integration layer 214 and the payment gateway adapter 130-X interact with each other using the APEX® payment gateway adapter APIs 216.

The payments platform 126 exposes the APEX® payment gateway adapter APIs 216 to allow developers of the payment gateways 140 to build payment gateway adapters 130. The payment gateway adapter 130-X is a payment gateway adapter of a particular payment gateway service provider 140. Each payment gateway adapter 130 is a managed package application that can be installed by a client 110 (e.g., org/tenant). Once the particular payment gateway adapter 130 is installed, properties and settings for that payment gateway adapter 130 can be configured by the client 110.

The payments platform 126 can then execute one of the payment gateway adapters that have been selected by a client to implement the set of APEX® payment gateway adapter APIs 216 so that APIs of particular payment gateway service 140 can be translated into the payment gateway client APIs 212 (APIs of the cloud computing platform 102). In other words, each payment gateway adapter 130 translates APIs of a particular payment gateway service into the APIs of the cloud computing platform 102 so that they are compatible. At a high-level the payment gateway adapter 130-X takes in a request APEX® object and returns a response APEX® object. The request APEX® object can be, for example, an authorization request, an authorization reversal request, a capture request, a sale request, a void request, or a refund request, etc. Similarly, the response APEX® object can be an authorization response, an authorization reversal response, a capture response, a sale response, a void response, or a refund response, etc.

Figure 2B:
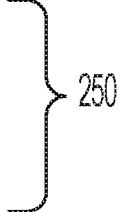
FIGS. 2B and 2C are collectively one non-limiting set of APIs for an APEX® interface in accordance with the disclosed embodiments.
Figure 2C:

FIGS. 2B and 2C are collectively one non-limiting set of APIs for an APEX® interface in accordance with the disclosed embodiments. FIG. 2B is an APEX® code sample 250 that is used to specify a signature of the payment gateway adapter 130 in accordance with the disclosed embodiments. FIG. 2C shows APEX® APIs 252, 254, 256 that are invoked by the payments platform 126 in accordance with the disclosed embodiments.

APEX® API 252 is used to specify namespaces for: a global class for a payment gateway context; a global payment gateway request to get a payment request; a global string get payment request type; a global interface for payment gateway response; a global class for a gateway error response; and a global interface or a payment gateway request.

APEX® API 254 is used to specify namespaces for: a global abstract class for an abstract response that implements the gateway response. APEX® API 254 is used to specify setter methods for common gateway response codes including: a gateway result code, a result code description, a result code of the cloud computing platform, reference number of the cloud computing platform, a gateway reference number, gateway reference details, gateway datum (time and date), amount, and a currency iso-code.

APEX® API 256 is used to specify namespaces for: a global class for an authorization response that extends the abstract response and contains setter methods for setting all of the response parameters specific to an authorization response; and a global class for an authorization request that includes payment gateway request getter methods for getting all the parameters of an authorization request.

FIG. 2D is an example of how a client will implement API for a specific payment gateway adapter 130 in accordance with the disclosed embodiments. More specifically, FIG. 2D shows APEX® pseudocode for an implementation of a payment gateway adapter, pseudocode for an authorization request and pseudocode authorization response in accordance with the disclosed embodiments. Although FIG. 2D shows pseudocode for an authorization request and pseudocode authorization response, it should be appreciated that the same or similar code pattern or structure can be used to implement other types of payment transactions including requests such as an authorization reversal request, a capture request, a sale request, a void request, and a refund request, and responses such as an authorization reversal response, a capture response, a sale response, a void response, and a refund response.

The code includes code for specifying a global class namespace for a payment gateway adapter; and a global namespace for specifying a gateway response process request and payment gateway context. The code includes a string request type used to specify payment gateway context for getting a payment request type. The code can be used to validate data and send an error response of the type gateway error response in the event there are any data validation errors. The code includes a body used to build an authorization request for a payment gateway context and to get a payment request, code to execute a call specified by the body, and code to create and return an authorization response. The code includes code for executing a call on string body for a private HTTP response. The code includes code for building an authorization request including a string for creating a request body and returning the request body. The private string for creating the request body includes a string transaction type, a string amount, a string currency iso-namespace, and a payment method. The code includes code for creating a JSON generator instance and writing data to a JSON string. If the payment method is a credit card, the code can write the card data to an end object and return a JSON generator instance as a string. The code includes code for specifying a private namespace and creating an authorization response. The code can be used to create a map of response values by parsing the response. The code includes code for populating an authorization response object and a payment method response. The code includes code for specifying a namespace for the payment method response and setting a gateway token by getting the map of response values, and then returning the authorization response. The code includes code for parsing the JSON string of the authorization response to key-value pairs, and then returning a map of response values by key.

Types of Payment Transactions/Operations/APIs

Referring again to FIG. 2A, the arrows 220 represent various types of payment transactions/operations that can take place between a client 110 and a customer 150. The payment transactions/operations represented by the arrows 220 can include, for example, an authorization transaction, an authorization reversal transaction, a capture transaction, a sale transaction, a void transaction, and a refund transaction. These payment transactions/operations will be described in greater detail below with reference to FIG. 3A.

Figure 3A:
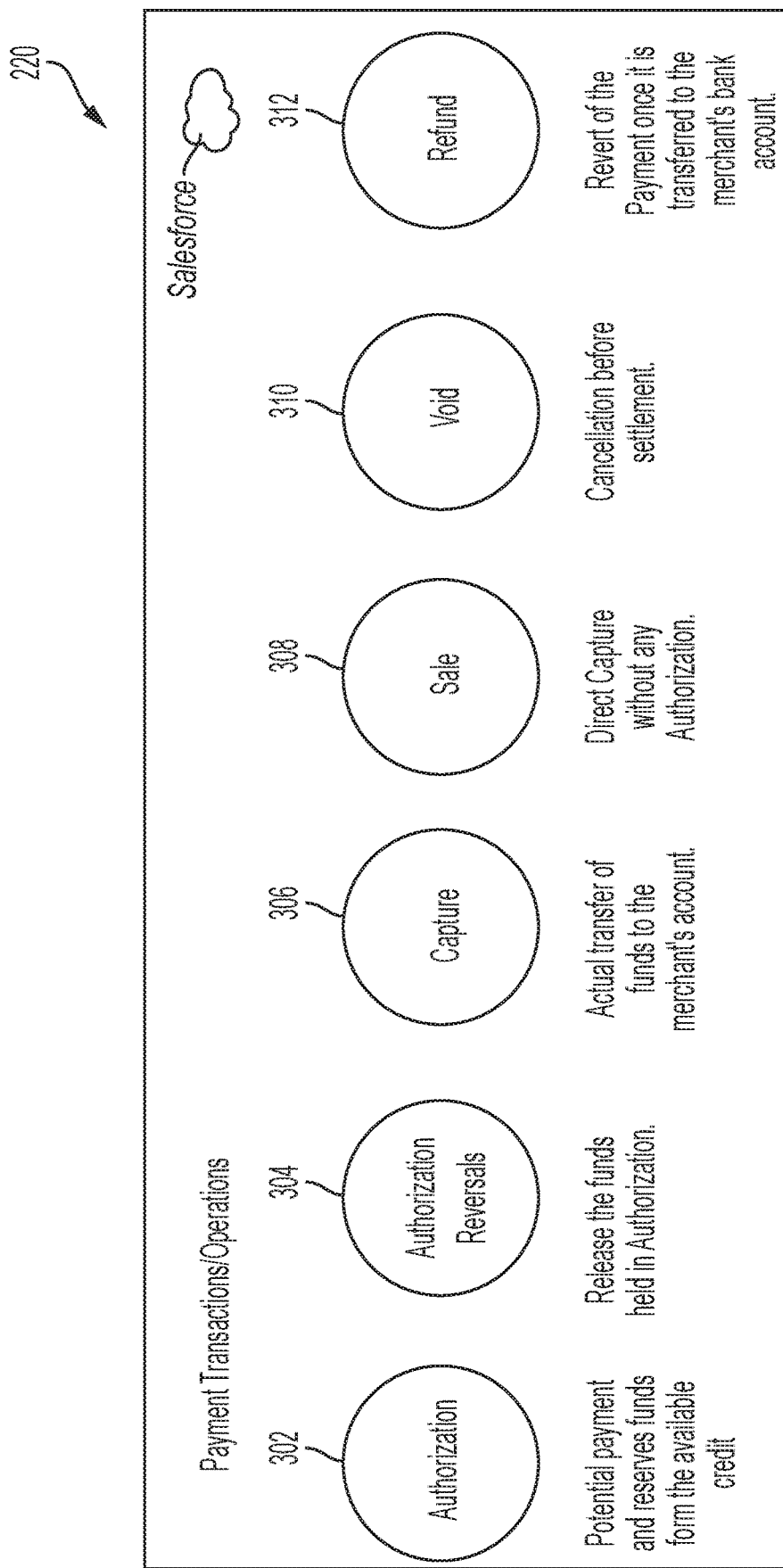
FIG. 3A is a conceptual diagram that shows various types of payment transactions/operations that are supported by the payments platform in accordance with the disclosed embodiments.

FIG. 3A is a conceptual diagram that shows various types of payment transactions/operations 220 that are supported by the payments platform 126 in accordance with the disclosed embodiments. As described with reference to FIG. 2A, the payments platform 126 provides or exposes corresponding APEX® payment gateway adapter APIs 216 for each of the different payment transactions/operations 220. The API definitions are universal for all clients 110. As shown in FIG. 3A, the payment transactions/operations include an authorization transaction/operation 302, an authorization reversal transaction/operation 304, a capture transaction/operation 306, a sale transaction/operation 308, a void transaction/operation 310, and a refund transaction/operation 312. It should be appreciated that there could be other types of transactions/operations that are not illustrated in FIG. 3A, as well as corresponding APIs for each of the other types of transactions/operations that are not illustrated in FIG. 3A.

An authorization transaction/operation 302 is a transaction for a potential payment by a customer 150 that reserves funds from available credit of the customer 150. An authorization transaction/operation 302 is not a payment. To explain further, an authorization transaction/operation 302 can reserve funds from the available credit of a credit card (or equivalent source of credit). As it is a reserve, there are no financial impacts for an authorization transaction/operation 302. An authorization transaction/operation 302 can be seen by the end user as a "pending transaction," but will not be included on the monthly card statement, even if it is seen on the credit card website.

An authorization reversal transaction/operation 304 is a transaction that releases funds of a customer 150 that are held in authorization. To explain further, an authorization reversal transaction/operation 304 gives back the funds on reserved via an authorization transaction/operation 302. When an authorization reversal transaction/operation 304 is performed, it will remove the authorization transaction/operation 302 from "pending transactions."

A capture transaction/operation 306 is a transaction that is an actual transfer of funds to a client's 110 bank account (e.g., merchant's bank account). To explain further, a capture transaction/operation 306 consumes the funds on reserved via an authorization transaction/operation 302. A capture transaction/operation 306 is typically done during the order shipment time.

A sale transaction/operation 308 is a direct capture transaction without any authorization. To explain further, a sale transaction/operation 308 is a type of transaction where an authorization transaction/operation 302 and a capture transaction/operation 306 are done as part of a single request. A sale transaction/operation 308 is typically done where the order is fulfilled immediately.

A transaction can be voided after purchase but before settlement. A void transaction/operation 310 is a transaction for cancellation of both a capture transaction/operation 306 and a sale transaction/operation 308 before settlement. In other words, a void transaction/operation 310 cancels the transfer of funds to a client's 110 bank account (e.g., merchant's bank account) before settlement. To explain further, when a payment is processed funds are held and the balance is deducted from the customer's credit limit, but not yet transferred to a client's 110 bank account (e.g., merchant's bank account). At a later point all transactions are batched up for settlement, and at that point the funds are transferred to the client's 110 bank account (e.g., merchant's bank account).

A refund transaction/operation 312 is a transaction that reverts a payment to a customer 150 after it has been transferred to the client's 110 bank account (e.g., merchant's bank account). To explain further, a refund transaction/operation 312 transfers the requested amount from the client's 110 bank account (e.g., merchant's bank account) back to the customer's account.

FIG. 3B shows an input payload structure of a request in accordance with the disclosed embodiments. In this particular example, the request is an authorization request; however, it should be appreciated that a similar code structure can be used for other types of requests such as an authorization reversal request, a capture request, a sale request, a void request, and a refund request. FIG. 3C shows an output payload structure of a response in accordance with the disclosed embodiments. In this particular example, the response is an authorization response; however, it should be appreciated that a similar code structure can be used for other types of responses such as an authorization reversal response, a capture response, a sale response, a void response, and a refund response. As such, FIG. 3B shows the input payload structure of an authorization request, whereas FIG. 3C shows the output payload structure of an authorization response.

FIG. 3D is an APEX® input payload structure of a request 350 and another APEX® output payload structure of a response 352 in accordance with the disclosed embodiments. Here again, in this particular example, the request 350 is an authorization request; however, it should be appreciated that a similar code structure can be used for other types of requests such as an authorization reversal request, a capture request, a sale request, a void request, and a refund request. Likewise, the response 352 is an authorization response; however, it should be appreciated that a similar code structure can be used for other types of responses such as an authorization reversal response, a capture response, a sale response, a void response, and a refund response.

External Processing Mode

As noted above with reference to FIG. 1, the payments platform 126 can support two different processing or recording modes for recording transaction data at the cloud computing platform 102. These two different modes will be referred to herein as "external mode" and "internal mode" or "Salesforce® mode."

External mode is used to support external systems. In external mode, interaction with a payment gateway 140 will happen outside of the cloud computing platform 102 (e.g., the Salesforce.com platform). Clients 110 will be able to record data from old or previously executed transactions that had occurred previously and outside of the cloud computing platform 102 (and outside of the payments platform 126) within the payments platform 126. In addition, clients 110 will be able to migrate old transaction data from other external systems to the cloud computing platform 102. For example, old transaction data from an enterprise resource planning (ERP) system that is external to or outside of the cloud computing platform 102 can be migrated to a database system 122 of the cloud computing platform 102.

For example, some clients 110 have complex systems, and one part of a transaction might occur externally in one part of the system that is external to the cloud computing platform 102. Any transaction data that occurs externally outside the cloud computing platform 102 can be migrated to and recorded within the cloud computing platform 102. Then, when another part of the transaction occurs in the cloud computing platform 102 (e.g., to handle the refund transaction when the customer returns the product) the previous transaction data is already available within the cloud computing platform 102 to perform that part of the transaction that occurs within the cloud computing platform 102.

In another example of external mode, a client may have large volumes of pre-existing transaction data from pre-existing transactions with customers, and then decide to start using the cloud computing platform 102. The client can migrate this external data to the cloud computing platform 102 using external mode. In addition, once this externally migrated data is available within the cloud computing platform 102 it can be used for other purposes (e.g., validation, reporting, analytics, etc.).

Figure 4A:
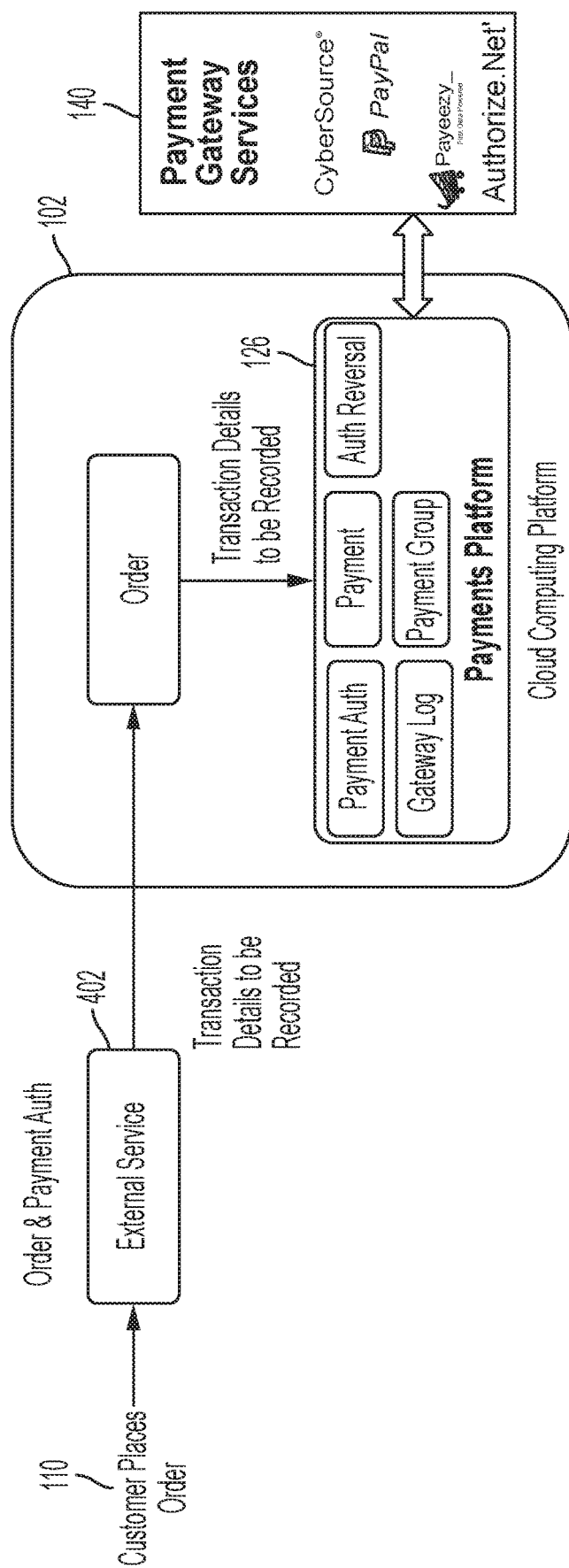
FIG. 4A is a block diagram that illustrates one example scenario of the payments platform operating in an external mode in accordance with the disclosed embodiments.

FIG. 4A is a block diagram that illustrates one example scenario of the payments platform 126 operating in an external mode in accordance with the disclosed embodiments. In FIG. 4A, one non-limiting example is shown of how the payments platform 126 can record an order and authorization transaction into the cloud computing platform 102 when the payments platform 126 is operating in external mode so that the information can be used during subsequent payment transactions/operations such as an authorization reversal transaction, a capture transaction, a sale transaction, a void transaction, a refund transaction, etc.).

For example, a client 110 of the cloud computing platform 102 can perform a payment authorization during checkout via an external service 402 (labeled Commerce Cloud Digital Storefront in FIG. 4A) that is external to the cloud computing platform 102 (i.e., outside of the cloud computing platform 102). The client 110 can then record the details of the authorization transaction within the payments platform 126 of the cloud computing platform 102. After the details from this external transaction are recorded within the payments platform 126, those details can later be utilized by the payments platform 126 during other types of transactions by the payments platform 126. For instance, when the order is ready to be shipped or fulfilled, the payments platform 126 can then use the same recorded transaction details to perform subsequent "capture" of payment.

Figure 4B:
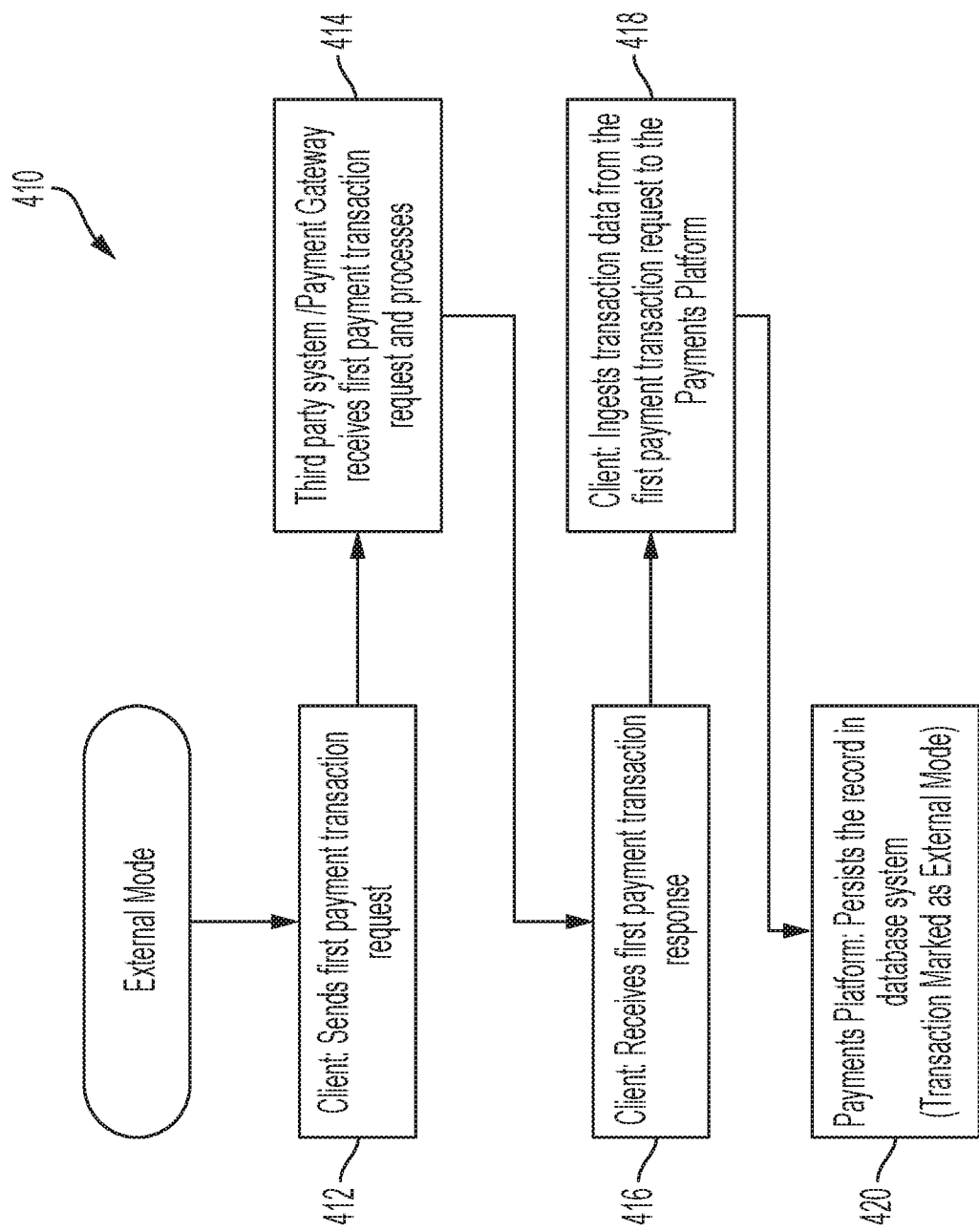
FIG. 4B is a flowchart that illustrates a method for recording data from an authorization transaction when a payments platform operates in an external mode in accordance with the disclosed embodiments.

FIG. 4B is a flowchart that illustrates a method 410 for recording data from an authorization transaction when a payments platform 126 operates in an external mode in accordance with the disclosed embodiments. The method 410 begins at 412, when a client 110 sends an authorization request to a payment gateway 140 (or other third-party system). At 414, the payment gateway 140 (or other third-party system) receives the authorization request and processes it. The method 410 then proceeds to 416, where the client 110 receives an authorization response from the payment gateway 140 (or other third-party system). The method 410 then proceeds to 418 where the client 110 ingests data from the authorization response into the payments platform 126. The method 410 then proceeds to 420, where the payments platform 126 persists a record for the authorization transaction in the database system 122. As will be explained with reference to FIG. 4C, the transaction data from the authorization transaction can be subsequently used for another capture transaction when the payments platform 126 later operates in internal mode.

Internal Processing Mode

An external transaction (i.e., that occurred when the payments platform 126 was operating in an external mode) that is recorded within the payments platform 126 can be used to carry out subsequent transaction using internal mode or vice versa. That is, once data from a transaction is ingested into by the payments platform 126, that data can then be used via APIs 204/212 of the payments platform 126 to perform other payment transactions. When the payments platform 126 operates in an internal mode (not illustrated in FIG. 4A and also referred to as "Salesforce® mode" herein), any interaction with a payment gateway 140 will happen within or "inside of" the cloud computing platform 102 (e.g., the Salesforce.com® platform). In internal mode, transactions occur within the payments platform 126, and clients 110 record all of the details at the payments platform 126.

Figure 4C:
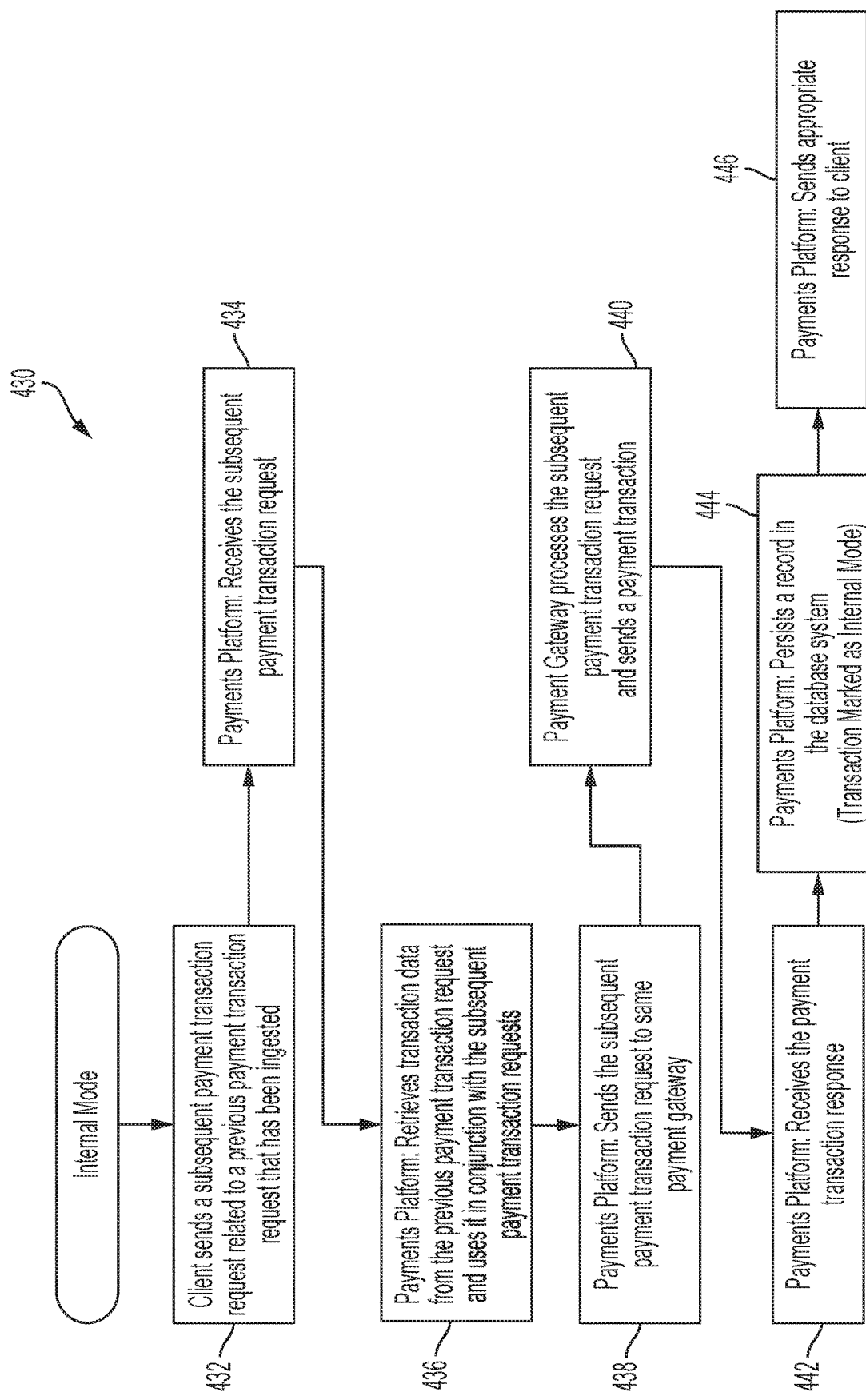
FIG. 4C is a flowchart that illustrates a method for using prior transaction data that was previously recorded from the authorization transaction of FIG. 4B when the payments platform operates in an internal mode to complete a capture transaction in accordance with the disclosed embodiments.

FIG. 4C is a flowchart that illustrates a method 430 for using prior transaction data from another payment transaction that was ingested into the payments platform 126 that occurred when the payments platform 126 was operating in external mode when the payments platform 126 operates in an internal mode to complete a capture transaction in accordance with the disclosed embodiments. In this particular non-limiting example, the prior transaction data from another payment transaction that was ingested into the payments platform 126 (that occurred when the payments platform 126 was operating in external mode) is prior transaction data that was previously recorded from the authorization transaction of FIG. 4B.

The method 430 begins at 432 when a client 110 sends a request for a capture transaction that corresponds or is related to a previous authorization transaction (e.g., the authorization request that was described above with reference to FIG. 4B). At 434, the payments platform 126 receives the request for the capture transaction, and the method 430 then proceeds to 436, where the payments platform 126 retrieves transaction data that was ingested from the previous authorization request (that was described above with reference to FIG. 4B). The method 430 then proceeds to 438, where the payments platform 126 sends the request for the capture transaction to the same payment gateway 140 (that was described above with reference to FIG. 4B). The method 430 then proceeds to 440, where the payment gateway 140 processes the request for the capture transaction, generates a response and sends the response to the payments platform 126. The method 430 then proceeds to 442, where the payments platform 126 receives the response, and then persists (at 444) a transaction record in the database system 122. The transaction record includes transaction data from the capture response, and the transaction is marked as having occurred in internal mode. At 446, the payments platform 126 sends an appropriate response to the client 110.

In the particular example illustrated in FIGS. 4B and 4C, one non-limiting example is described in which data from an authorization transaction that originated when the payments platform 126 is operating in external mode is recorded, and then used in FIG. 4C for a subsequent capture transaction by the payments platform 126 when it is operating in internal mode. It should be noted that although FIGS. 4B and 4C describe a particular, non-limiting example in which authorization and capture transactions are described, respectively, these examples are non-limiting, and that other types of payment transactions can also be performed in a similar manner when the payments platform 126 is operating in external mode and then used in other subsequent transactions by the payments platform 126 when it is operating in internal mode. For instance, payment transactions such as capture and refund, or capture and void may also be performed by the payments platform 126 is a similar manner. Further, it should also be appreciated that the reverse is also true, meaning that a payment transaction may originate in internal mode and then be subsequently used for a later payment transaction that occurs in external mode.

Figure 5:
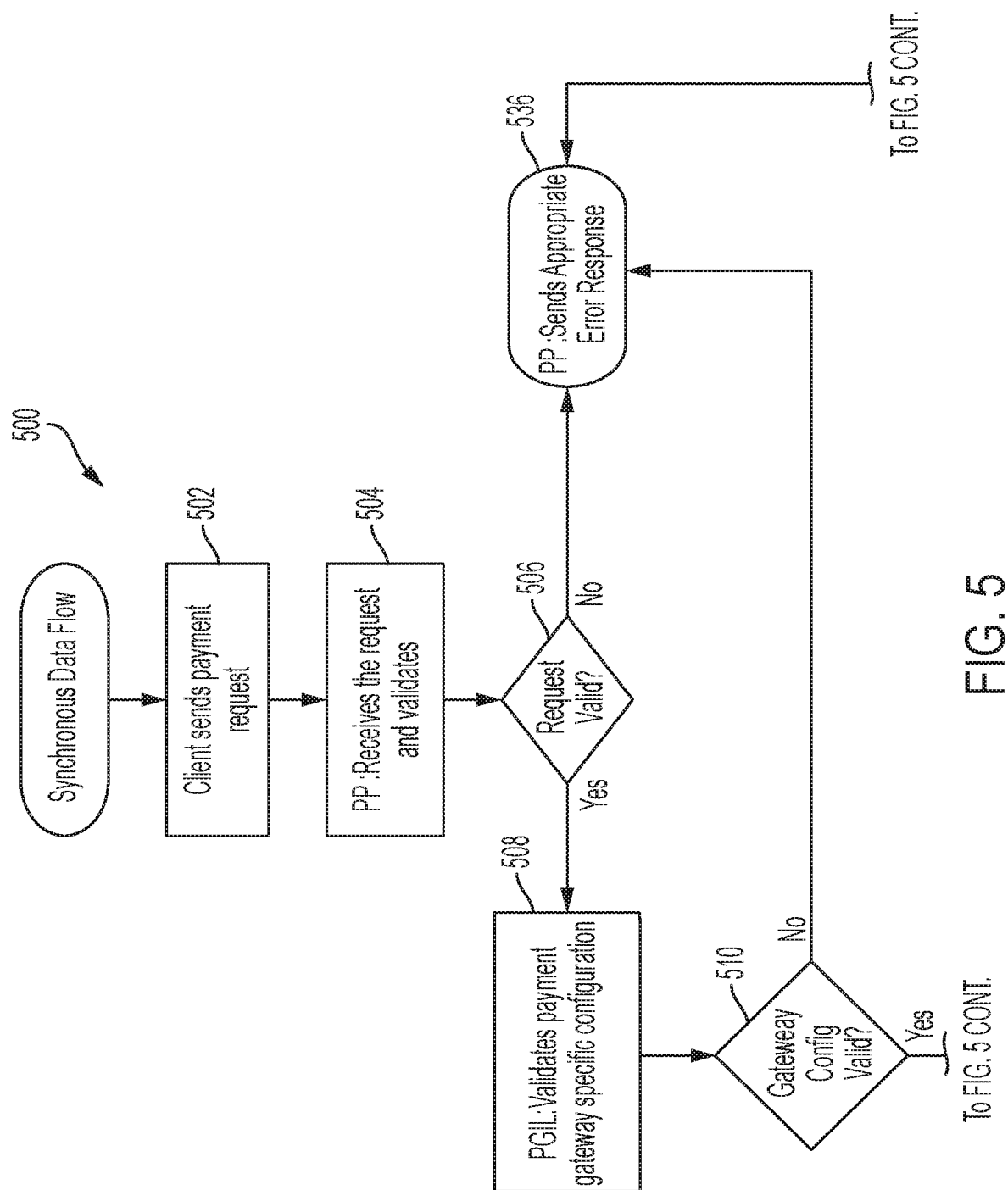
FIG. 5 is a flowchart that illustrates a synchronous payment transaction data flow method between elements of the payments platform, a payment gateway adapter and a payment gateway in accordance with the disclosed embodiments.
Figure 5:
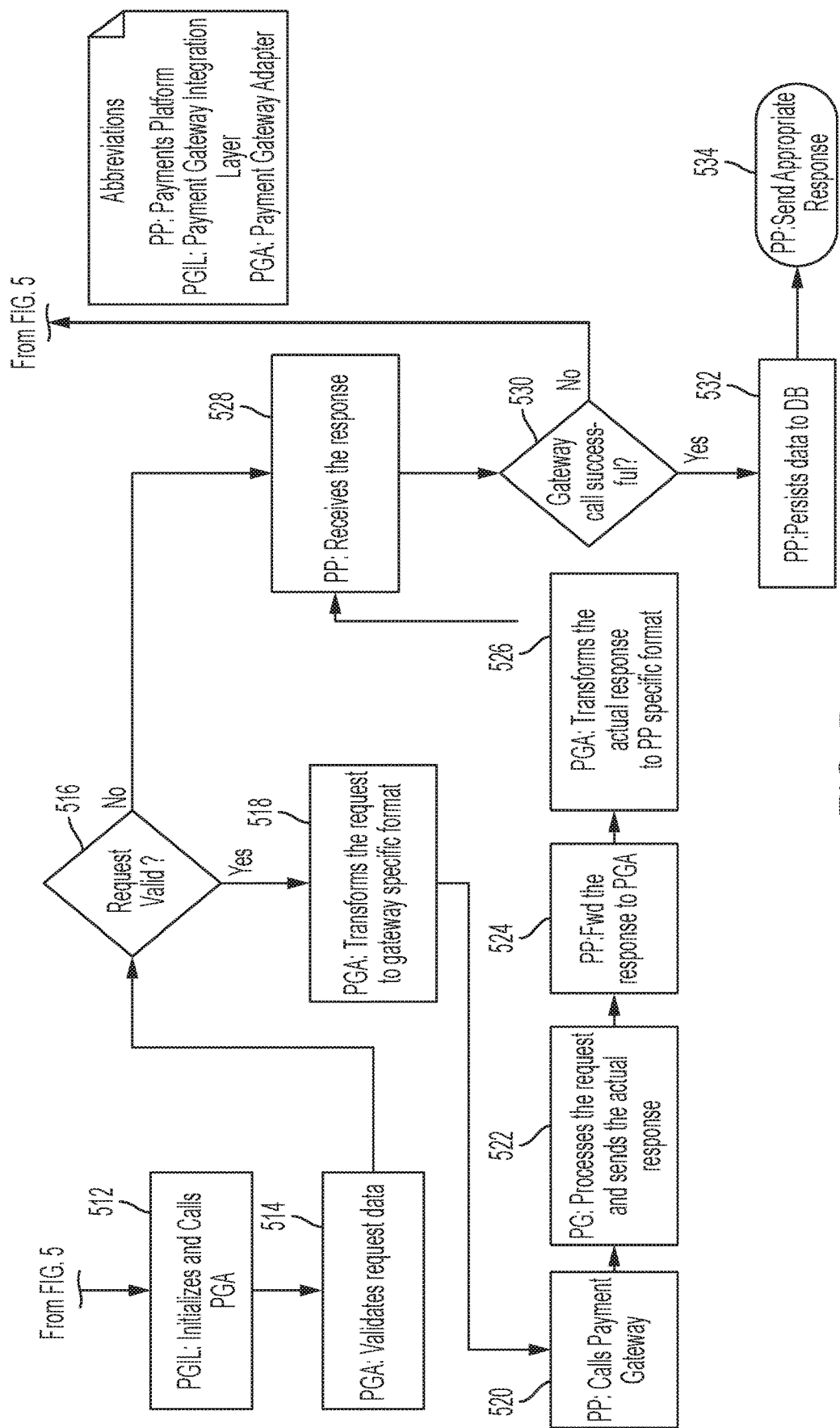

FIG. 5 is a flowchart that illustrates a synchronous payment transaction data flow method 500 between elements of the payments platform 126, a payment gateway adapter 130 and a payment gateway 140 in accordance with the disclosed embodiments. The method 500 is a "synchronous" payment transaction data flow method because the payment gateway processes requests from clients synchronously meaning that a request is received (at 504), and then processed to generate an actual response and the actual response is sent to the payments platform 126 (at 522) as part of the same interaction (e.g., same call or same thread). The payments platform 126 can then forward that response to the particular payment gateway adapter 130. In this mode there is always a response back which means creation of a payment entity is deterministic. There is no need for creation of a payment entity in a pending state and later marking it in error if an unsuccessful response is received.

The synchronous payment transaction data flow method 500 begins at 502, when a particular client 110 sends a request to the payments platform 126.

The synchronous payment transaction data flow method 500 then proceeds to 504, where the payments platform 126 receives and validates the request received from the particular client 110. The synchronous payment transaction data flow method 500 then proceeds to 506, where the payments platform 126 determines whether the request is valid. When the payments platform 126 determines (at 506) that the payment request is invalid, the synchronous payment transaction data flow method 500 then proceeds to 536, where the payments platform 126 sends an appropriate error response to the particular client 110 that indicates why the request from the client 110 was invalid.

When the payments platform 126 determines (at 506) that the request is valid, the synchronous payment transaction data flow method 500 then proceeds to 508, where the payment gateway integration layer 214 of the business logic layer 210 validates a specific configuration of the payment gateway 140. The synchronous payment transaction data flow method 500 then proceeds to 510, where the payment gateway integration layer 214 determines whether the specific configuration of the payment gateway 140 is valid.

When the payment gateway integration layer 214 determines (at 510) that the specific configuration of the payment gateway 140 is invalid, the synchronous payment transaction data flow method 500 then proceeds to 536, where the payments platform 126 sends the particular client 110 an appropriate error response that indicates why the configuration of the payment gateway 140 was invalid.

When the payment gateway integration layer 214 determines (at 510) that the configuration of the payment gateway 140 is valid, the synchronous payment transaction data flow method 500 then proceeds to 512, where the payment gateway integration layer 214 sends the client 110 initializes and calls a particular payment gateway adapter 130 for the particular payment gateway 140. The synchronous payment transaction data flow method 500 then proceeds to 514, where the payment gateway adapter 130 validates the request data. The request data can include the payload that was sent as part of the request. For example, if the payment gateway adapter was expecting a Card Verification Value (CVV) number to be 3 or 4 digits, and a client sends 2 digits or 6 digits then payment gateway adapter might validate this and send an error instead of going all the way to the gateway.

The synchronous payment transaction data flow method 500 then proceeds to 516, where the payment gateway adapter 130 determines whether data from the request is valid. When the payment gateway adapter 130 determines (at 516) that the request data is invalid, the synchronous payment transaction data flow method 500 then proceeds to 528, where the payments platform 126 receives a response that indicates why request data was invalid.

When the payment gateway adapter 130 determines (at 516) that the request data is valid, the synchronous payment transaction data flow method 500 then proceeds to 518, where the payment gateway adapter 130 transforms the request into a gateway specific format for that particular payment gateway 140. The synchronous payment transaction data flow method 500 then proceeds to 520, where the payments platform 126 performs internal processing and then payment gateway adapter 130 calls the particular payment gateway 140. The synchronous payment transaction data flow method 500 then proceeds to 522 where the payment gateway 140 processes the request and sends an actual response to the payments platform 126 in the same interaction (e.g., call or thread). The synchronous payment transaction data flow method 500 then proceeds to 524, where the payments platform 126 forwards the response to the particular payment gateway adapter 130. The synchronous payment transaction data flow method 500 then proceeds to 526, where the payment gateway adapter 130 transforms the response into a specific format used by the payments platform 126, and then to 528, where the payments platform 126 receives the response from the payment gateway adapter 130.

At 530, the payments platform 126 determines whether the gateway call was successful. When the payments platform 126 determines (at 530) that the gateway call was successful, the synchronous payment transaction data flow method 500 proceeds to 532, where the payments platform 126 persists data to the database system 122, and then to 534, where the payments platform 126 sends the particular client 110 an appropriate response, and the synchronous payment transaction data flow method 500 ends. By contrast, when the payments platform 126 determines (at 530) that the gateway call was not successful, the synchronous payment transaction data flow method 500 proceeds to 536, where the payments platform 126 sends an appropriate error response to the particular client 110, and the synchronous payment transaction data flow method 500 ends.

Figure 6:
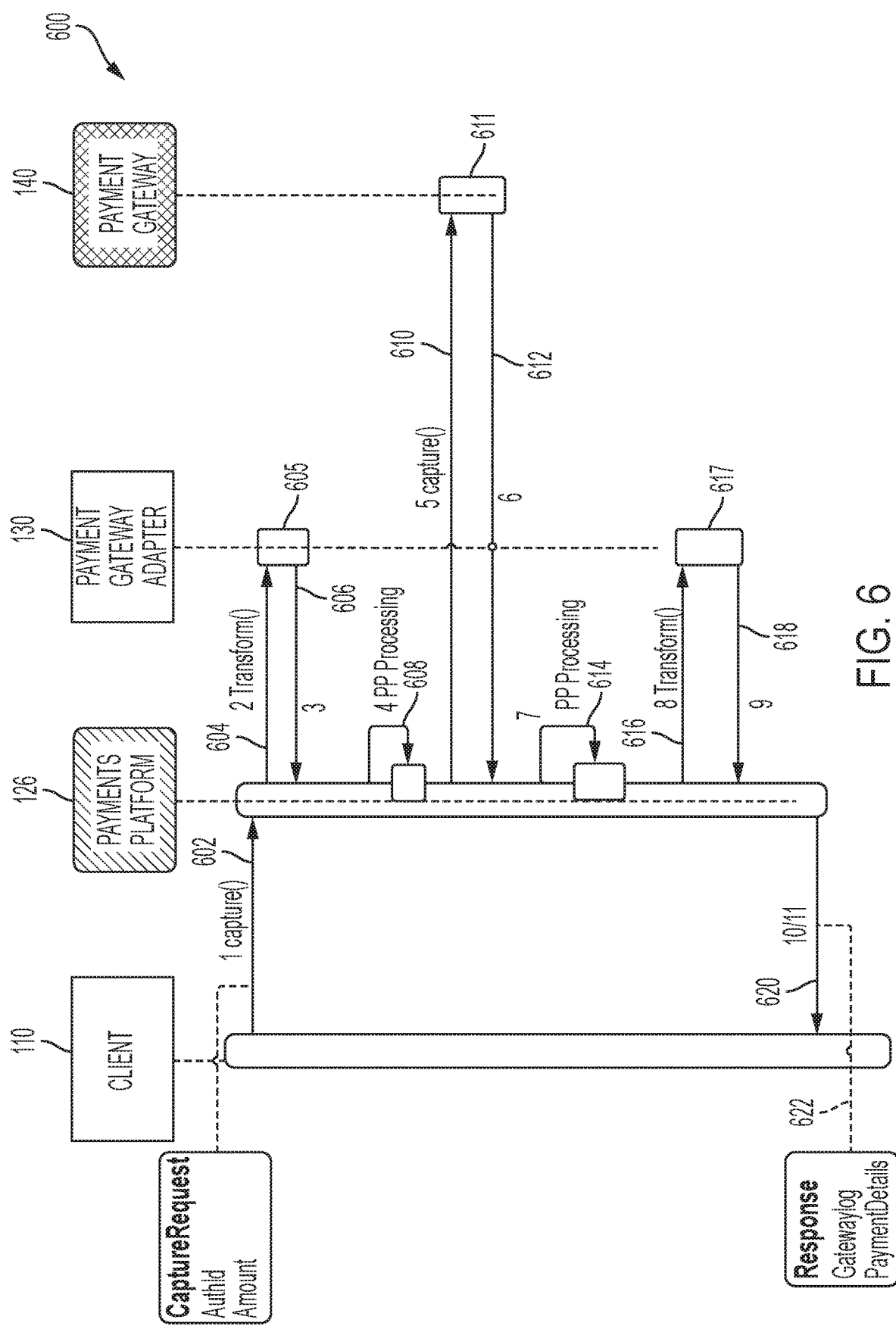
FIG. 6 is a flow diagram that illustrates a synchronous payment transaction data flow between a client of the cloud computing platform, the payments platform, a payment gateway adapter and a payment gateway in accordance with the disclosed embodiments.

FIG. 6 is a flow diagram that illustrates a synchronous payment transaction data flow 600 between a client 110 of the cloud computing platform 102, the payments platform 126, a payment gateway adapter 130 and a payment gateway 140 in accordance with the disclosed embodiments. In FIG. 6 an example is shown where a payment capture request is received from a client. However, it should be appreciated that the data flow could apply to other types of payment transactions/operations, such as, an authorization transaction, an authorization reversal transaction, a sale transaction, a void transaction, a refund transaction, etc.

The data flow 600 begins at 602 when the payments platform 126 receives payment capture request from a client 110. At 604, the payments platform 126 sends the payment capture request to a particular payment gateway adapter 130 (that is managed package in a client organization), and the particular payment gateway adapter 130 transforms the payment capture request (at 605) to generate a transformed payment request that is sent to the payments platform 126.

At 606, the payments platform 126 receives the transformed payment request from the payment gateway adapter 130. At 608, the payments platform 126 creates a payment gateway log record. The payment gateway log record includes data from the transformed payment request and a payment gateway ID. At this time the gateway log status is null/in-process. At 610, the payments platform 126 makes a call to a payment gateway 140 endpoint with the transformed payment request, and at 611, the payment gateway 140 processes the transformed payment request to generate a response.

At 612, the payments platform 126 receives the response from the payment gateway 140. At 614, the payments platform 126 performs processing to create or update records (e.g., payment records, payment gateway log records, etc.) and stores the records. For example, the payments platform 126 can perform processing to update the existing payment gateway log record (that as created at 808) with the response, and to create a payment record with payment details. At this point, the gateway interaction status of the existing payment gateway log record can be updated to either success, failed, timeout, etc., and also updated with other values like gateway auth code, gateway reference number, gateway result code, salesforce result code, gateway result code description, gateway date, gateway message, gateway AVS code, response data, etc.

At 616, the payments platform 126 sends the updated response to the payment gateway adapter 130 for transformation. At 617, the payment gateway adapter 130 transforms the updated response (as described above with reference to 526 of FIG. 7) to generate a transformed response. At 618, the payments platform 126 receives the transformed response from the payment gateway adapter 130. At 620, the payments platform 126 evaluates the transformed response to determine whether it was successful or unsuccessful, and may perform processing to create or update a payment record and a status of the payment record, and/or optionally publish an event notification. The method 600 ends at 622, where the payments platform 126 sends an appropriate response to the client 110 with the existing payment gateway log record with gateway log details, and/or payment record (which can be null when the transformed response was unsuccessful). The content of the response varies depending on whether the transformed response was successful or unsuccessful.

For example, when the transformed response was successful (e.g., that the response from the payment gateway 140 indicated that the transaction was successful), at 620 the payments platform 126 creates a payment record with a status that indicates "processed", and then responds back to the client at 622 with gateway log details, payment record details, and other fields. The payment record can include some or all of the financial of payment details related to payment such as amount, payment method details, payment type (e.g., capture or sale), transaction date, payment gateway that was used, etc.

By contrast, when the transformed response was unsuccessful, at 620 the payments platform 126 updates the existing payment gateway log record (from 604), and responds back to the client at 622 with a payment gateway ID. No payment record is created by the payments platform 126, when the transformed response was unsuccessful.

Figure 7:
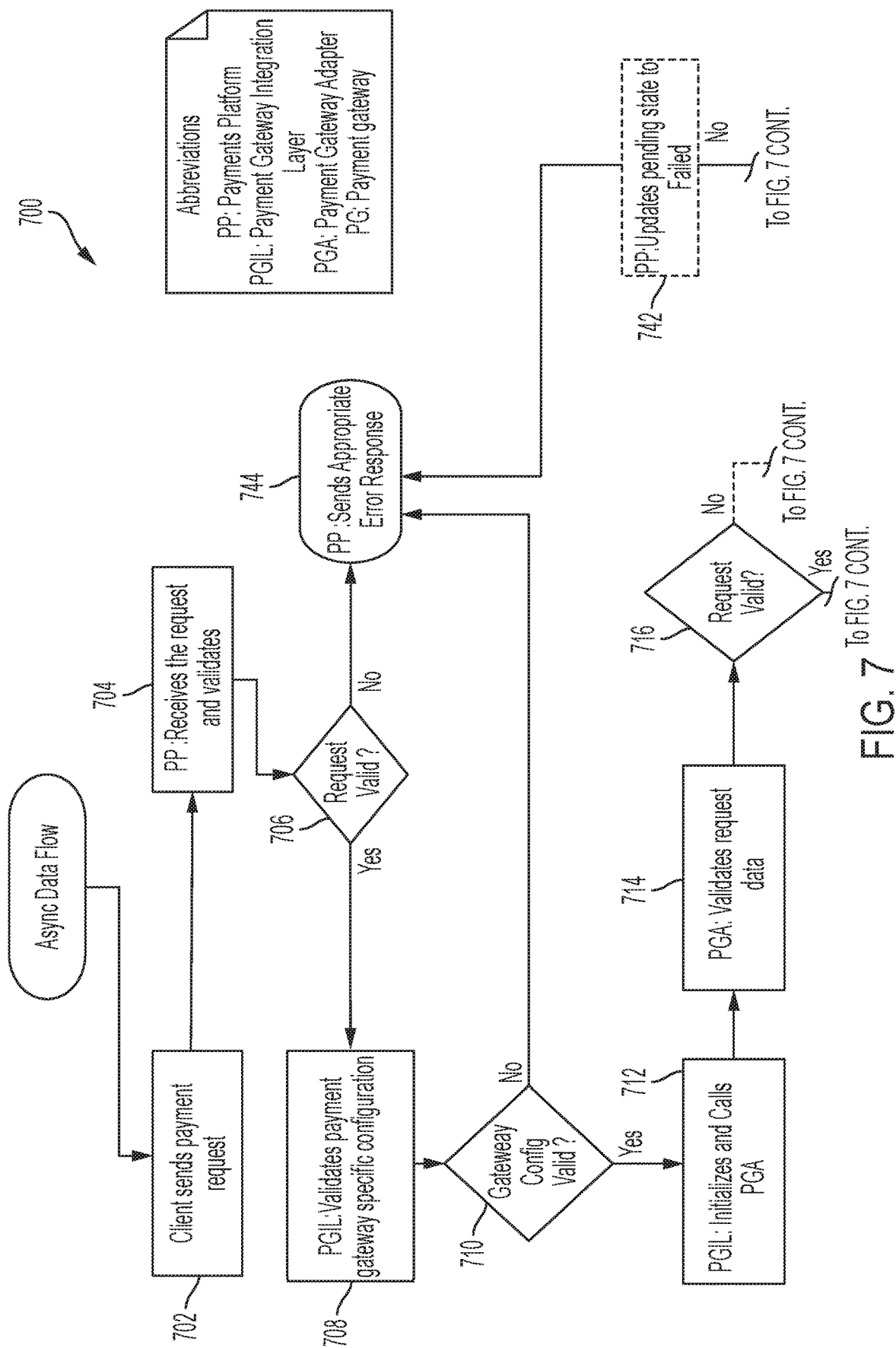
FIG. 7 is a flowchart that illustrates a payment transaction data flow method between elements of the payments platform, a payment gateway adapter and a payment gateway in accordance with the disclosed embodiments.
Figure 7:
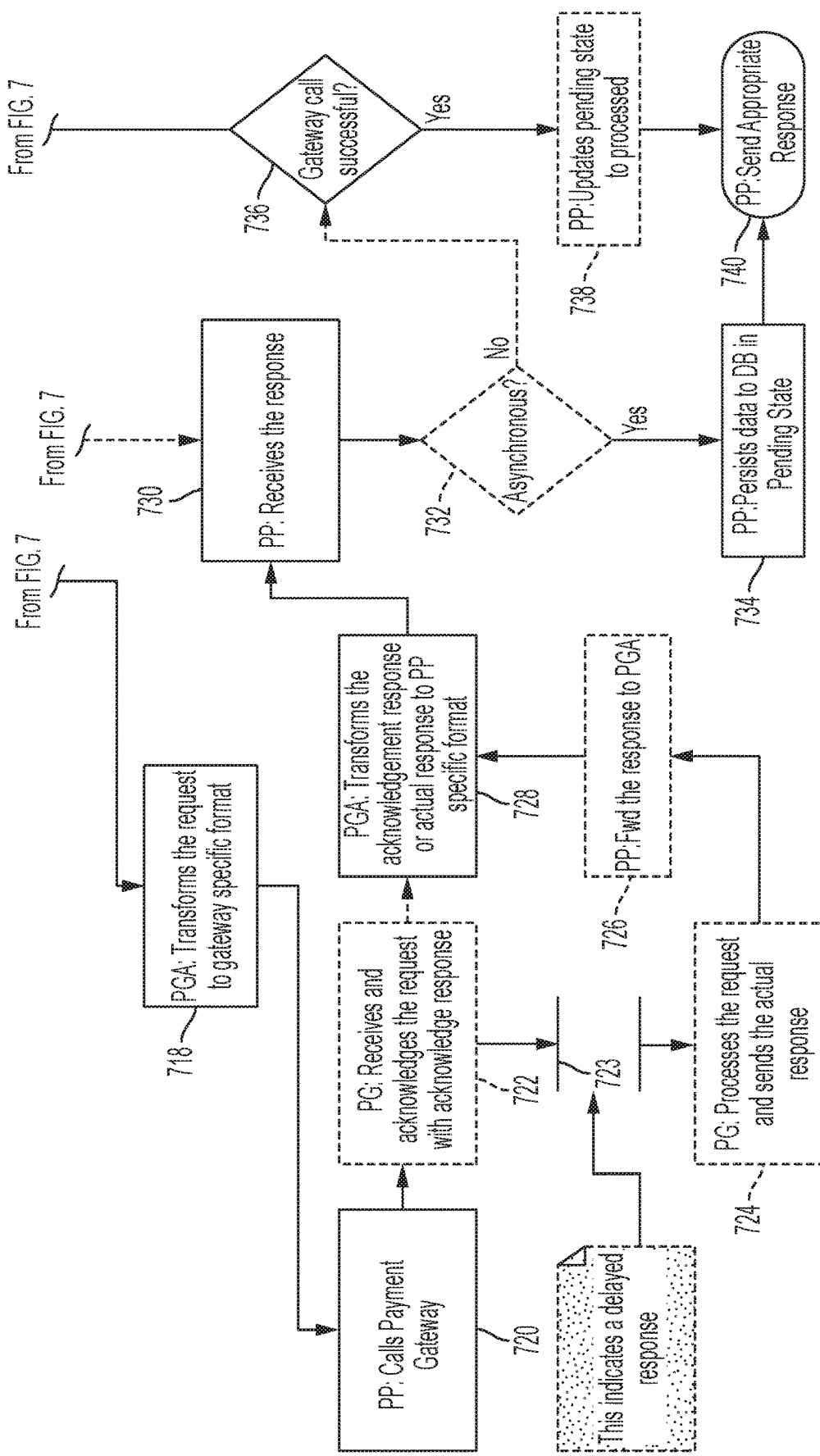

In accordance with the disclosed embodiments, the payments platform 126 can work seamlessly with both synchronous and asynchronous payment gateways 140. FIG. 7 is a flowchart that illustrates a payment transaction data flow method 700 between elements of the payments platform 126, a payment gateway adapter 130 and a payment gateway 140 in accordance with the disclosed embodiments. In an asynchronous payment transaction data flow method, the payment gateway processes requests from clients 110 asynchronously meaning that there is a delay period between the payment gateway 140 receiving and acknowledging a request, and then processing the request and sending an actual response to the payments platform 126 so that the payments platform 126 can then forward that response to the particular payment gateway adapter 130. In this asynchronous mode the payment response is not deterministic, meaning that the payment gateway 140 may receive a request and acknowledged the request as part of one interaction (e.g., that same call/thread), and then process and/or send an actual response to the payments platform 126 as part of another interaction (e.g., different call or thread).

The payment transaction data flow method 700 begins at 702, when a particular client 110 sends a payment request to the payments platform 126. The payment transaction data flow method 700 then proceeds to 704, where the payments platform 126 receives and validates the request received from the particular client 110. The payment transaction data flow method 700 then proceeds to 706, where the payments platform 126 determines whether the request is valid. When the payments platform 126 determines (at 706) that the request is invalid, the payment transaction data flow method 700 then proceeds to 744, where the payments platform 126 causes an appropriate error response to be sent to the particular client 110 that indicates why the request from the client 110 was invalid. When the payments platform 126 causes the error response to be sent to the particular client 110, this means that the payments platform 126 can, for example, take action (e.g., raise events/notifications or call another service provided by client 110) to indirectly provide the client 110 with the error response.

When the payments platform 126 determines (at 706) that the request is valid, the payment transaction data flow method 700 then proceeds to 708, where the payment gateway integration layer 214 of the business logic layer 210 validates a specific configuration of the payment gateway 140. The payment transaction data flow method 700 then proceeds to 710, where the payment gateway integration layer 214 determines whether the specific configuration of the payment gateway 140 is valid.

When the payment gateway integration layer 214 determines (at 710) that the specific configuration of the payment gateway 140 is invalid, the payment transaction data flow method 700 then proceeds to 744, where the payments platform 126 sends the particular client 110 an appropriate error response that indicates why the configuration of the payment gateway 140 was invalid.

When the payment gateway integration layer 214 determines (at 710) that the configuration of the payment gateway 140 is valid, the payment transaction data flow method 700 then proceeds to 712, where the payment gateway integration layer 214 initializes and calls a particular payment gateway adapter 130 for the particular payment gateway 140. The payment transaction data flow method 700 then proceeds to 714, where the payment gateway adapter 130 validates the request data.

The payment transaction data flow method 700 then proceeds to 716, where the payment gateway adapter 130 determines whether the request data is valid. When the payment gateway adapter 130 determines (at 716) that the request data is invalid, the payment transaction data flow method 700 then proceeds to 730, where the payments platform 126 receives a response that indicates that the request data was invalid.

When the payment gateway adapter 130 determines (at 716) that the request data is valid, the payment transaction data flow method 700 then proceeds to 718, where the payment gateway adapter 130 transforms the request into a gateway specific format for that particular payment gateway 140. The payment transaction data flow method 700 then proceeds to 720, where the payments platform 126 performs internal processing, and then the payment gateway adapter 130 calls the particular payment gateway 140.

The payment transaction data flow method 700 then proceeds to 722, where the particular payment gateway 140 receives and acknowledges that the transformed request has been received/accepted by sending an acknowledgment response, and then to 728, where the payment gateway adapter 130 transforms the acknowledgment response into a specific format used by the payments platform 126. In this embodiment, because the payment gateway 140 is an asynchronous payment gateway 140, following 722, there is a delay period (at 723) between the payment gateway 140 receiving the request in one interaction (e.g., call or thread) at a certain time and sending an actual response to the payments platform 126 in another separate interaction (e.g., call or thread) that happens at a later time.

How this happens can vary depending on the implementation of the asynchronous payment gateway 140, the payments platform 126 and the payment gateway adapter 130. This can happen, for example, because in some implementations the asynchronous payment gateway 140 might call the payments platform 126 and let it know the status, whereas in other implementations the payments platform 126 might call the payment gateway adapter 130 and ask for the status. For example, in one implementation shown in FIG. 7, the asynchronous payment gateway 140 can receive and acknowledge the request (at 722) in an interaction (e.g., call or thread) at a certain time, and then proceeds to 724 where the payment gateway 140 processes the request and sends an actual response to the payments platform 126 in another interaction (e.g., call or thread) that happens at a later time. However, it should be appreciated that in other implementations, the asynchronous payment gateway 140 can receive the request in an interaction (e.g., call or thread) at a certain time, and then acknowledge and/or process the request in another thread, and then send an actual response to the payments platform 126 in a yet another separate thread. In yet other implementations, the asynchronous payment gateway 140 can receive and acknowledge the request (at 722) and then process the request in an interaction (e.g., call or thread) at a certain time, and then send an actual response to the payments platform 126 in another interaction (e.g., call or thread) that happens at a later time. Regardless of the implementation of the asynchronous payment gateway 140, the response from the payment gateway 140 will come in another interaction (e.g., call or thread) that happens at a later time from the thread in which the payment gateway 140 receives the request (at 722).

After the payment gateway 140 processes the request and sends an actual response to the payments platform 126, the payment transaction data flow method 700 then proceeds to 726, where the payments platform 126 forwards the response to the particular payment gateway adapter 130.

Following 726, the payment transaction data flow method 700 then proceeds to 728, where the payment gateway adapter 130 transforms the actual response into a specific format used by the payments platform 126. Following 728, the payment transaction data flow method 700 then proceeds to 730, where the payments platform 126 receives the transformed response from the payment gateway adapter 130. The payment transaction data flow method 700 then proceeds to 732, where the payments platform 126 determines, based on the transformed response that was received (at 730), whether the payment gateway 140 is an asynchronous payment gateway 140. It should be noted that when the method 700 starts during run time, the payments platform 126 does not know if a payment gateway 140 is synchronous or asynchronous payment gateway because there is no configuration information that indicates whether the payment gateway is synchronous or asynchronous. As will be explained in greater detail below, when a response is received from payment gateway adapter 130 (at 730), the payments platform 126 can process the response and determine if the response from the payment gateway 140 is a synchronous response or an asynchronous response.

When the payments platform 126 determines that the payment gateway 140 is an asynchronous payment gateway 140, the payment transaction data flow method 700 then proceeds to 734, where the payments platform 126 persists data to the database system 122 in a pending state, and then to 740, where the payments platform 126 causes an appropriate response to be sent to the particular client 110. When the payments platform 126 causes the response to be sent to the particular client 110, this means that the payments platform 126 can, for example, take action (e.g., raise events/notifications or call another service provided by client 110) to indirectly provide the client 110 with the response. As used herein a "pending state" can refer to a state in which the payment gateway 140 has acknowledged the request, but has not determined whether the payment was successful or not. Keeping the record in that state is important because when the response is received, all of request data cannot be created from the response.

By contrast, when the payments platform 126 determines (at 732) that the payment gateway 140 is a synchronous payment gateway 140, the payment transaction data flow method 700 then proceeds to 736, where the payments platform 126 determines whether the gateway call was successful.

When the payments platform 126 determines (at 736) that the gateway call was successful, the payment transaction data flow method 700 proceeds to 738, where the payments platform 126 updates the pending state to processed, and then to 740, where the payments platform 126 causes an appropriate response to be sent to the particular client 110, and the payment transaction data flow method 700 ends. When the payments platform 126 causes the response to be sent to the particular client 110, this means that the payments platform 126 can, for example, take action (e.g., raise events/notifications or call another service provided by client 110) to indirectly provide the client 110 with the response.

When the payments platform 126 determines (at 736) that the gateway call was not successful, the payment transaction data flow method 700 proceeds to 742, where the payments platform 126 updates the pending state to failed, and then to 744, where the payments platform 126 causes an appropriate error response to be sent to the particular client 110, and the payment transaction data flow method 700 ends. When the payments platform 126 causes the error response to be sent to the particular client 110, this means that the payments platform 126 can, for example, take action (e.g., raise events/notifications or call another service provided by client 110) to indirectly provide the client 110 with the error response.

Figure 8:
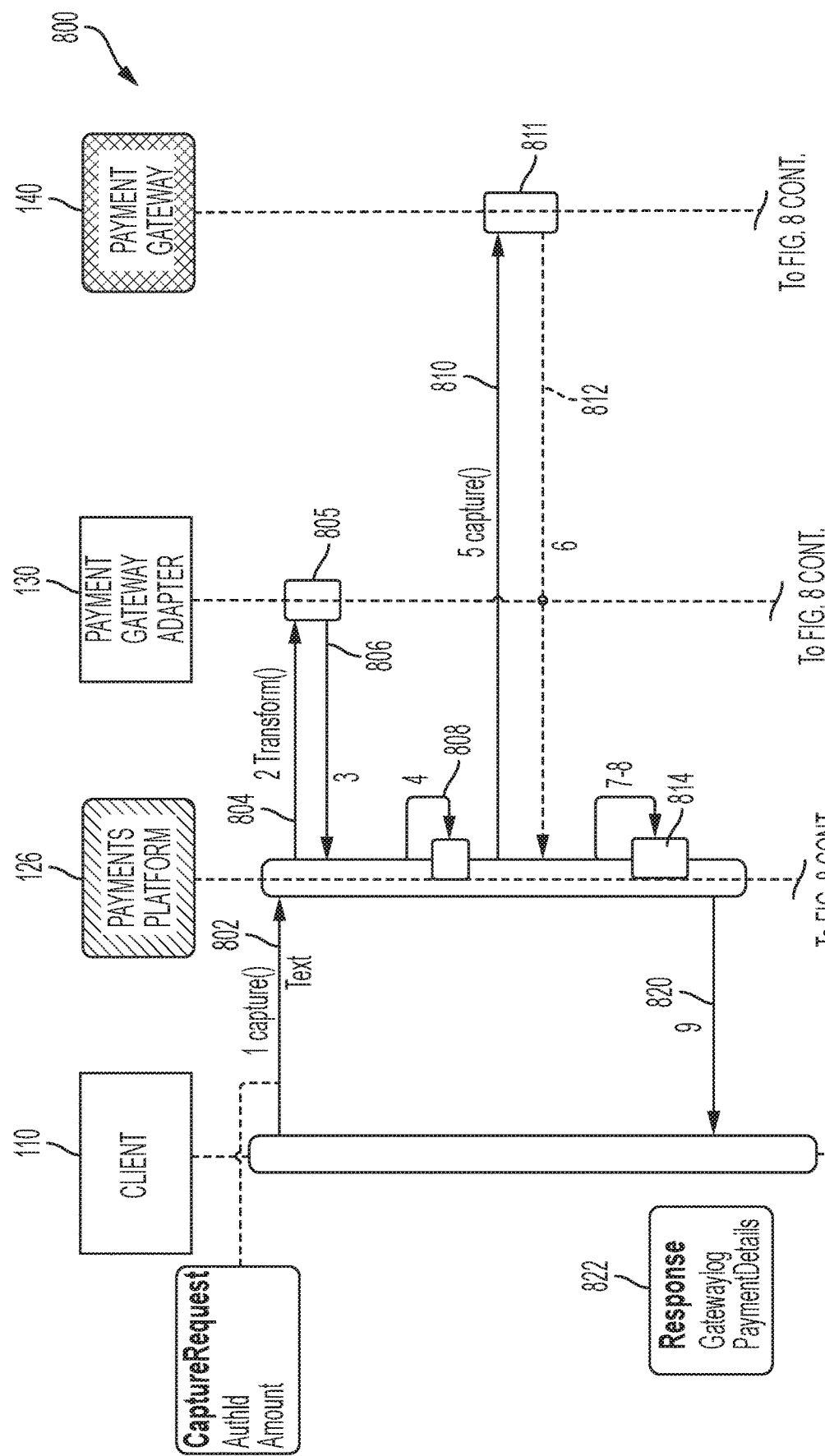
FIG. 8 is a flow diagram that illustrates an asynchronous payment transaction data flow between a client of the cloud computing platform, the payments platform, a payment gateway adapter and a payment gateway in accordance with the disclosed embodiments.

FIG. 8 is a flow diagram that illustrates an asynchronous payment transaction data flow 800 between a client 110 of the cloud computing platform 102, the payments platform 126, a payment gateway adapter 130 and a payment gateway 140 in accordance with the disclosed embodiments. In FIG. 8 an example is shown where a payment capture request is received from a client. However, it should be appreciated that the data flow could apply to other types of payment transactions/operations, such as, an authorization transaction, an authorization reversal transaction, a sale transaction, a void transaction, a refund transaction, etc.

The data flow 800 begins at 802 when the payments platform 126 receives payment capture request from a client 110. At 804, the payments platform 126 sends the payment capture request to a particular payment gateway adapter 130 (that is managed package in a client organization), and the particular payment gateway adapter 130 transforms the payment capture request at 805 to generate a transformed payment request that is sent to the payments platform 126.

At 806, the payments platform 126 receives the transformed payment request from the payment gateway adapter 130. At 808, the payments platform 126 creates a payment gateway log record. The payment gateway log record includes data from the transformed payment request and a payment gateway ID. At this time the gateway log status is null/in-process (or incomplete), and the payment linked to this gateway log is still in pending state. At 810, the payments platform 126 makes a call to a payment gateway 140 endpoint with the transformed payment request, and at 811, the payment gateway 140 processes the transformed payment request to generate an acknowledgment response.

At 812, the payment gateway adapter 130 receives the acknowledgment response from the payment gateway 140, and the particular payment gateway adapter 130 transforms the acknowledgment response to generate a transformed acknowledgment response that is sent to the payments platform 126. The line is shown as a dotted line to indicate that the response at 812 is an acknowledgement response (as opposed to an actual response).

At 814, the payments platform 126 performs processing to create or update records (e.g., payment records, payment gateway log records, etc.) and stores the records. For example, the payments platform 126 can perform processing to update the existing payment gateway log record (that as created at 808) with the response, and to create a payment record with payment details and a status set to pending. At this point, the gateway interaction status of the existing payment gateway log record can be updated to either success, failed, timeout, etc., and also updated with other values like gateway auth code, gateway reference number, gateway result code, salesforce result code, gateway result code description, gateway date, gateway message, gateway AVS code, response data, etc.

At 820, the payments platform 126 sends a response 822 back to the client with payment details (e.g., a payment ID and payment gateway log ID) that are related to a payment object created in the cloud computing platform 102.

After a delay period, at 823, the payment gateway 140 generates a response. In one embodiment, at 824, the payment gateway 140 calls back directly to the payments platform 126 to process the response. In another embodiment, at 824, the payment gateway 140 calls back to the APEX® rest endpoint 825 at the payment gateway adapter 130, and then at 826, the payment gateway adapter 130 calls a recording API from the payments platform 126 to process the response received from the payment gateway 140.

At 828, the payments platform 126 performs processing to create anew payment gateway log record that will be linked back to the payment gateway log record that was created at 808, updates the payment record, and stores the records. The new payment gateway log record includes a cleansed request response string, normalized data, various reference codes to track the payment from the payment gateway to the issuing bank, etc.

At 830, the payments platform 126 sends a response to the payment gateway adapter 130 for transformation. At 831, the payment gateway adapter 130 transforms the response (as described above with reference to 728 of FIG. 7) to generate a transformed response. At 832, the payments platform 126 receives the transformed response from the payment gateway adapter 130. At 834, the payments platform 126 evaluates the transformed response to determine whether it was successful or unsuccessful, and performs processing to update the payment record and the status of the payment record, and publishes an event notification.

For example, when the payments platform 126 determines (at 834) that the transformed response was successful, the payments platform 126 updates the payment record, the status of the payment record to indicate that it has been processed, and publishes the event notification that indicates that the payment was processed and that the end customer payment is in sync with the payment platform, the gateway, etc. The payment record can include some or all of the financial of payment details related to payment such as amount, payment method details, payment type (e.g., capture or sale), transaction date, payment gateway that was used, etc.

By contrast, when the payments platform 126 determines (at 834) that the transformed response was unsuccessful, the payments platform 126 updates the payment record, the status of a payment record to indicate that it has failed, been cancelled and adds a new status field, and publishes the event notification that indicates that the platform in in synchronization with the payment gateway (e.g., so that a situation does not arise where a customer sees a payment, but the merchant does not).

As noted above with reference to FIG. 1, in one implementation, the technologies described above with reference to FIGS. 1-8 can be used in conjunction with a cloud computing platform, such as a multitenant database system, that provides applications and services to multiple tenants or organizations via the cloud computing platform. One example of such a system will now be described below with reference to FIGS. 9-12.

Figure 9:
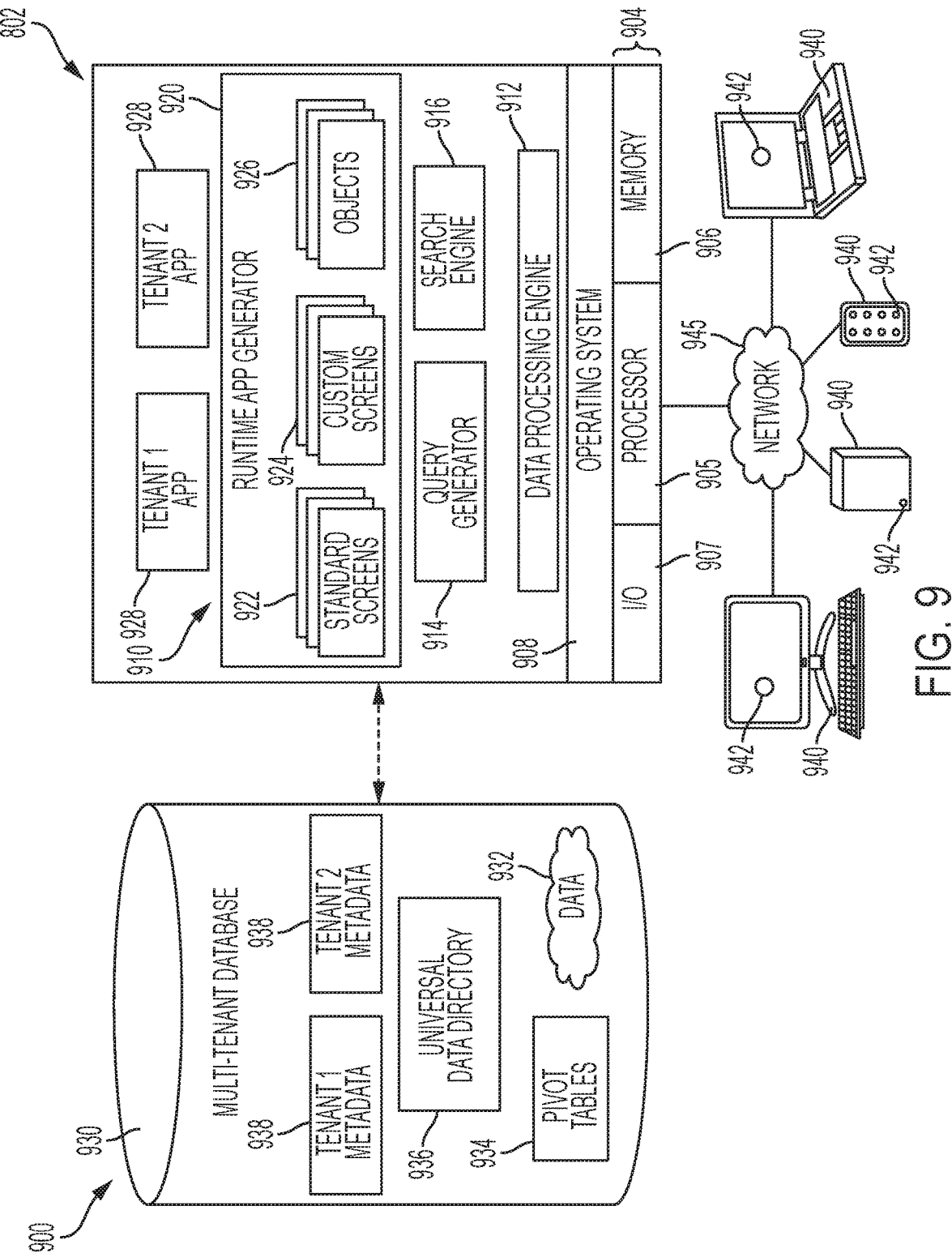
FIG. 9 is a schematic block diagram of an example of a multi-tenant computing environment in which features of the disclosed embodiments can be implemented in accordance with the disclosed embodiments.

FIG. 9 is a schematic block diagram of an example of a multi-tenant computing environment in which features of the disclosed embodiments can be implemented in accordance with the disclosed embodiments. As shown in FIG. 9, an exemplary cloud-based solution may be implemented in the context of a multi-tenant system 900 including a server 902 that supports applications 928 based upon data 932 from a database 930 that may be shared between multiple tenants, organizations, or enterprises, referred to herein as a multi-tenant database. The multi-tenant system 900 can be shared by many different organizations, and handles the storage of, and access to, different metadata, objects, data and applications across disparate organizations. In one embodiment, the multi-tenant system 900 can be part of a database system, such as a multi-tenant database system.

The multi-tenant system 900 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 900 allows users of user systems 940 to establish a communicative connection to the multi-tenant system 900 over a network 945 such as the Internet or any type of network described herein. Based on a user's interaction with a user system 940, the application platform 910 accesses an organization's data (e.g., records held by an object) and metadata that is stored at one or more database systems 930, and provides the user system 940 with access to applications based on that data and metadata. These applications are executed or run in a process space of the application platform 910 will be described in greater detail below. The user system 940 and various other user systems (not illustrated) can interact with the applications provided by the multi-tenant system 900. The multi-tenant system 900 is configured to handle requests for any user associated with any organization that is a tenant of the system. Data and services generated by the various applications 928 are provided via a network 945 to any number of user systems 940, such as desktops, laptops, tablets, smartphones or other client devices, Google Glass™, and any other computing device implemented in an automobile, aircraft, television, or other business or consumer electronic device or system, including web clients.

Each application 928 is suitably generated at run-time (or on-demand) using a common application platform 910 that securely provides access to the data 932 in the database 930 for each of the various tenant organizations subscribing to the system 900. The application platform 910 has access to one or more database systems 930 that store information (e.g., data and metadata) for a number of different organizations including user information, organization information, custom information, etc. The database systems 930 can include a multi-tenant database system 930 as described with reference to FIG. 9, as well as other databases or sources of information that are external to the multi-tenant database system 930 of FIG. 9. In accordance with one non-limiting example, the service cloud 900 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 930. In this regard, each tenant includes one or more users and/or groups associated with, authorized by, or otherwise belonging to that respective tenant. Stated another way, each respective user within the multi-tenant system 900 is associated with, assigned to, or otherwise belongs to a particular one of the plurality of enterprises supported by the system 900.

Each enterprise tenant may represent a company, corporate department, business or legal organization, and/or any other entities that maintain data for particular sets of users (such as their respective employees or customers) within the multi-tenant system 900. Although multiple tenants may share access to the server 902 and the database 930, the particular data and services provided from the server 902 to each tenant can be securely isolated from those provided to other tenants. The multi-tenant architecture therefore allows different sets of users to share functionality and hardware resources without necessarily sharing any of the data 932 belonging to or otherwise associated with other organizations.

The multi-tenant database 930 may be a repository or other data storage system capable of storing and managing the data 932 associated with any number of tenant organizations. The database 930 may be implemented using conventional database server hardware. In various embodiments, the database 930 shares processing hardware 904 with the server 902. In other embodiments, the database 930 is implemented using separate physical and/or virtual database server hardware that communicates with the server 902 to perform the various functions described herein.

In an exemplary embodiment, the database 930 includes a database management system or other equivalent software capable of determining an optimal query plan for retrieving and providing a particular subset of the data 932 to an instance of application (or virtual application) 928 in response to a query initiated or otherwise provided by an application 928, as described in greater detail below. The multi-tenant database 930 may alternatively be referred to herein as an on-demand database, in that the database 930 provides (or is available to provide) data at run-time to on-demand virtual applications 928 generated by the application platform 910, as described in greater detail below.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants.

Tenant-specific formatting, functions and other constructs may be maintained as tenant-specific metadata 938 for each tenant, as desired. Rather than forcing the data 932 into an inflexible global structure that is common to all tenants and applications, the database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data 932 from the database 930.

The server 902 may be implemented using one or more actual and/or virtual computing systems that collectively provide the dynamic application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware 904, such as a processor 905, memory 906, input/output features 907 and the like. The input/output features 907 generally represent the interface(s) to networks (e.g., to the network 945, or any other local area, wide area or other network), mass storage, display devices, data entry devices and/or the like.

The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short-term or long-term storage or other computer-readable media capable of storing programming instructions for execution on the processor 905, including any sort of random-access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or platform, e.g., a portable hard drive, a USB flash drive, an optical disc, or the like.

The server 902, application platform 910 and database systems 930 can be part of one backend system. Although not illustrated, the multi-tenant system 900 can include other backend systems that can include one or more servers that work in conjunction with one or more databases and/or data processing components, and the application platform 910 can access the other backend systems.

The multi-tenant system 900 includes one or more user systems 940 that can access various applications provided by the application platform 910. The application platform 910 is a cloud-based user interface. The application platform 910 can be any sort of software application or other data processing engine that generates the virtual applications 928 that provide data and/or services to the user systems 940. In a typical embodiment, the application platform 910 gains access to processing resources, communications interfaces and other features of the processing hardware 904 using any sort of conventional or proprietary operating system 908. The virtual applications 928 are typically generated at run-time in response to input received from the user systems 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the user systems 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other client program 942 associated with its user system 940, as appropriate.

The runtime application generator 920 suitably interacts with the query generator 914 to efficiently obtain multi-tenant data 932 from the database 930 as needed in response to input queries initiated or otherwise provided by users of the user systems 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request.

With continued reference to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 932 associated with each virtual application 928 is provided to the database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled user system 940 on the network 945. In an exemplary embodiment, the user system 940 includes a display device, such as a monitor, screen, or another conventional electronic display capable of graphically presenting data and/or information retrieved from the multi-tenant database 930, as described in greater detail below.

Typically, the user operates a conventional browser application or other client program 942 executed by the user system 940 to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928, the runtime application generator 920 suitably creates the application at run time based upon the metadata 938, as appropriate. However, if a user chooses to manually upload an updated file (through either the web-based user interface or through an API), it will also be shared automatically with all of the users/devices that are designated for sharing.

As noted above, the virtual application 928 may contain JAVA®, ActiveX, or other content that can be presented using conventional client software running on the user system 940; other embodiments may simply provide dynamic web or other content that can be presented and viewed by the user, as desired. As described in greater detail below, the query generator 914 suitably obtains the requested subsets of data 932 from the database 930 as needed to populate the tables, reports or other features of the particular virtual application 928.

Objects and Records

In one embodiment, the multi-tenant database system 930 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

The following description is of one example of a system in which the features described above may be implemented. The components of the system described below are merely one example and should not be construed as limiting. The features described above may be implemented in any other type of computing environment, such as one with multiple servers, one with a single server, a multi-tenant server environment, a single-tenant server environment, or some combination of the above.

Figure 10:
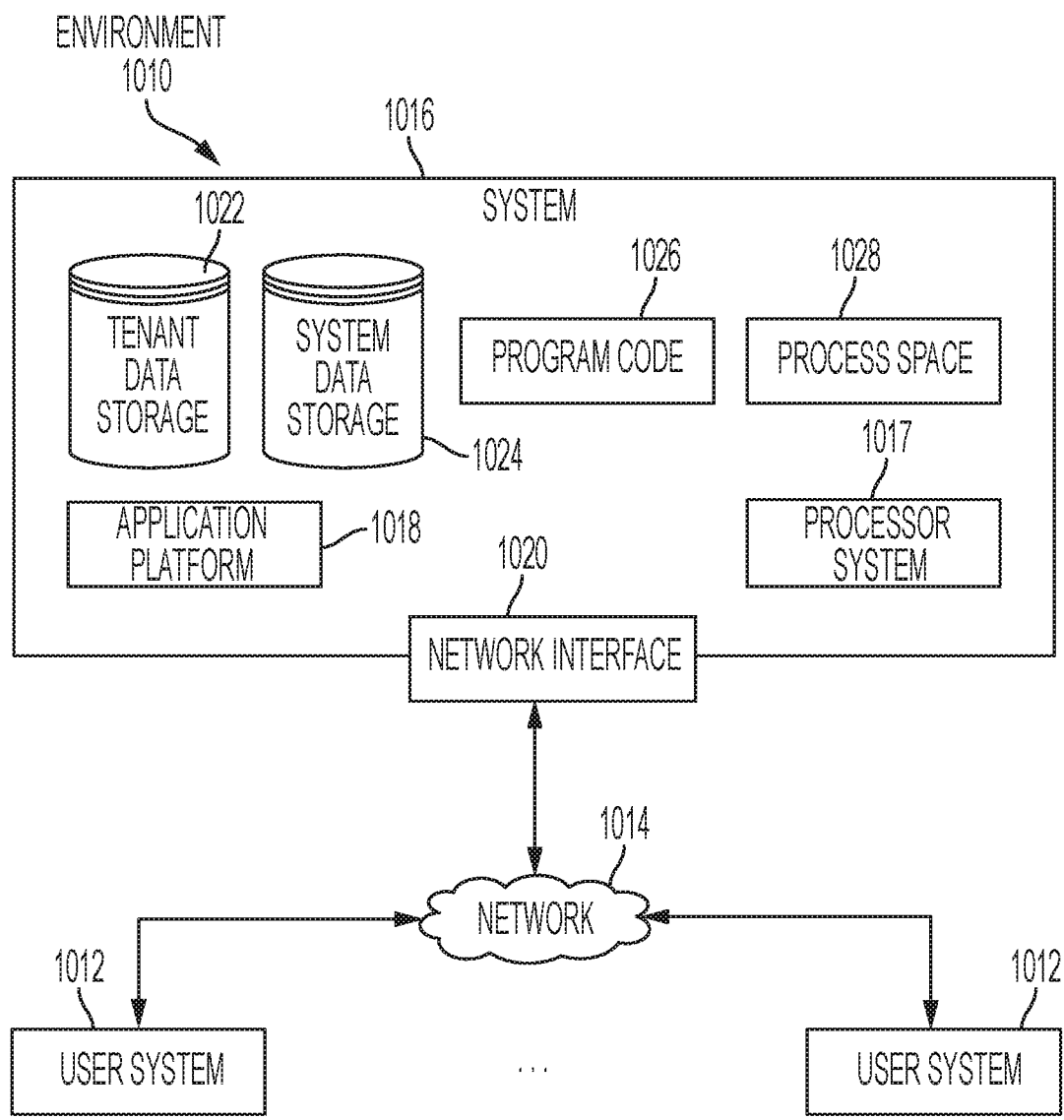
FIG. 10 shows a block diagram of an example of an environment in which an on-demand database service can be used in accordance with some implementations.

FIG. 10 shows a block diagram of an example of an environment 1010 in which an on-demand database service can be used in accordance with some implementations. The environment 1010 includes user systems 1012, a network 1014, a database system 1016 (also referred to herein as a "cloud-based system"), a processor system 1017, an application platform 1018, a network interface 1020, tenant database 1022 for storing tenant data 1023, system database 1024 for storing system data 1025, program code 1026 for implementing various functions of the system 1016, and process space 1028 for executing database system processes and tenant-specific processes, such as running applications as part of an application hosting service. In some other implementations, environment 1010 may not have all of these components or systems, or may have other components or systems instead of, or in addition to, those listed above.

In some implementations, the environment 1010 is an environment in which an on-demand database service exists. An on-demand database service, such as that which can be implemented using the system 1016, is a service that is made available to users outside of the enterprise(s) that own, maintain or provide access to the system 1016. As described above, such users generally do not need to be concerned with building or maintaining the system 1016. Instead, resources provided by the system 1016 may be available for such users' use when the users need services provided by the system 1016; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1018 can be a framework that allows the applications of system 1016 to execute, such as the hardware or software infrastructure of the system 1016. In some implementations, the application platform 1018 enables the creation, management and execution of one or more applications developed by the provider of the on-demand database service, users accessing the on-demand database service via user systems 1012, or third-party application developers accessing the on-demand database service via user systems 1012.

In some implementations, the system 1016 implements a web-based customer relationship management (CRM) system. For example, in some such implementations, the system 1016 includes application servers configured to implement and execute CRM software applications as well as provide related data, code, forms, renderable webpages and documents and other information to and from user systems 1012 and to store to, and retrieve from, a database system related data, objects, and Webpage content. In some MTS implementations, data for multiple tenants may be stored in the same physical database object in tenant database 1022. In some such implementations, tenant data is arranged in the storage medium(s) of tenant database 1022 so that data of one tenant is kept logically separate from that of other tenants so that one tenant does not have access to another tenant's data, unless such data is expressly shared. The system 1016 also implements applications other than, or in addition to, a CRM application. For example, the system 1016 can provide tenant access to multiple hosted (standard and custom) applications, including a CRM application. User (or third-party developer) applications, which may or may not include CRM, may be supported by the application platform 1018. The application platform 1018 manages the creation and storage of the applications into one or more database objects and the execution of the applications in one or more virtual machines in the process space of the system 1016.

According to some implementations, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1014 can be or include any network or combination of networks of systems or devices that communicate with one another. For example, the network 1014 can be or include any one or any combination of a LAN (local area network), WAN (wide area network), telephone network, wireless network, cellular network, point-to-point network, star network, token ring network, hub network, or other appropriate configuration. The network 1014 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 1012 can communicate with system 1016 using TCP/IP and, at a higher network level, other common Internet protocols to communicate, such as HTTP, FTP, AFS, WAP, etc. In an example where HTTP is used, each user system 1012 can include an HTTP client commonly referred to as a "web browser" or simply a "browser" for sending and receiving HTTP signals to and from an HTTP server of the system 1016. Such an HTTP server can be implemented as the sole network interface 1020 between the system 1016 and the network 1014, but other techniques can be used in addition to or instead of these techniques. In some implementations, the network interface 1020 between the system 1016 and the network 1014 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1012 can be implemented as any computing device(s) or other data processing apparatus or systems usable by users to access the database system 1016. For example, any of user systems 1012 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1012 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1016) of the user system 1012 to access, process and view information, pages and applications available to it from the system 1016 over the network 1014.

Each user system 1012 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1012 in conjunction with pages, forms, applications and other information provided by the system 1016 or other systems or servers. For example, the user interface device can be used to access data and applications hosted by system 1016, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1012 may differ in their respective capacities, and the capacity of a particular user system 1012 can be entirely determined by permissions (permission levels) for the current user of such user system. For example, where a salesperson is using a particular user system 1012 to interact with the system 1016, that user system can have the capacities allotted to the salesperson. However, while an administrator is using that user system 1012 to interact with the system 1016, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1012 and some or all of its components are operator-configurable using applications, such as a browser, including computer code executed using a central processing unit (CPU) such as an Intel Pentium® processor or the like. Similarly, the system 1016 (and additional instances of an MTS, where more than one is present) and all of its components can be operator-configurable using application(s) including computer code to run using the processor system 1017, which may be implemented to include a CPU, which may include an Intel Pentium® processor or the like, or multiple CPUs.

The system 1016 includes tangible computer-readable media having non-transitory instructions stored thereon/in that are executable by or used to program a server or other computing system (or collection of such servers or computing systems) to perform some of the implementation of processes described herein. For example, computer program code 1026 can implement instructions for operating and configuring the system 1016 to intercommunicate and to process webpages, applications and other data and media content as described herein. In some implementations, the computer code 1026 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 11:
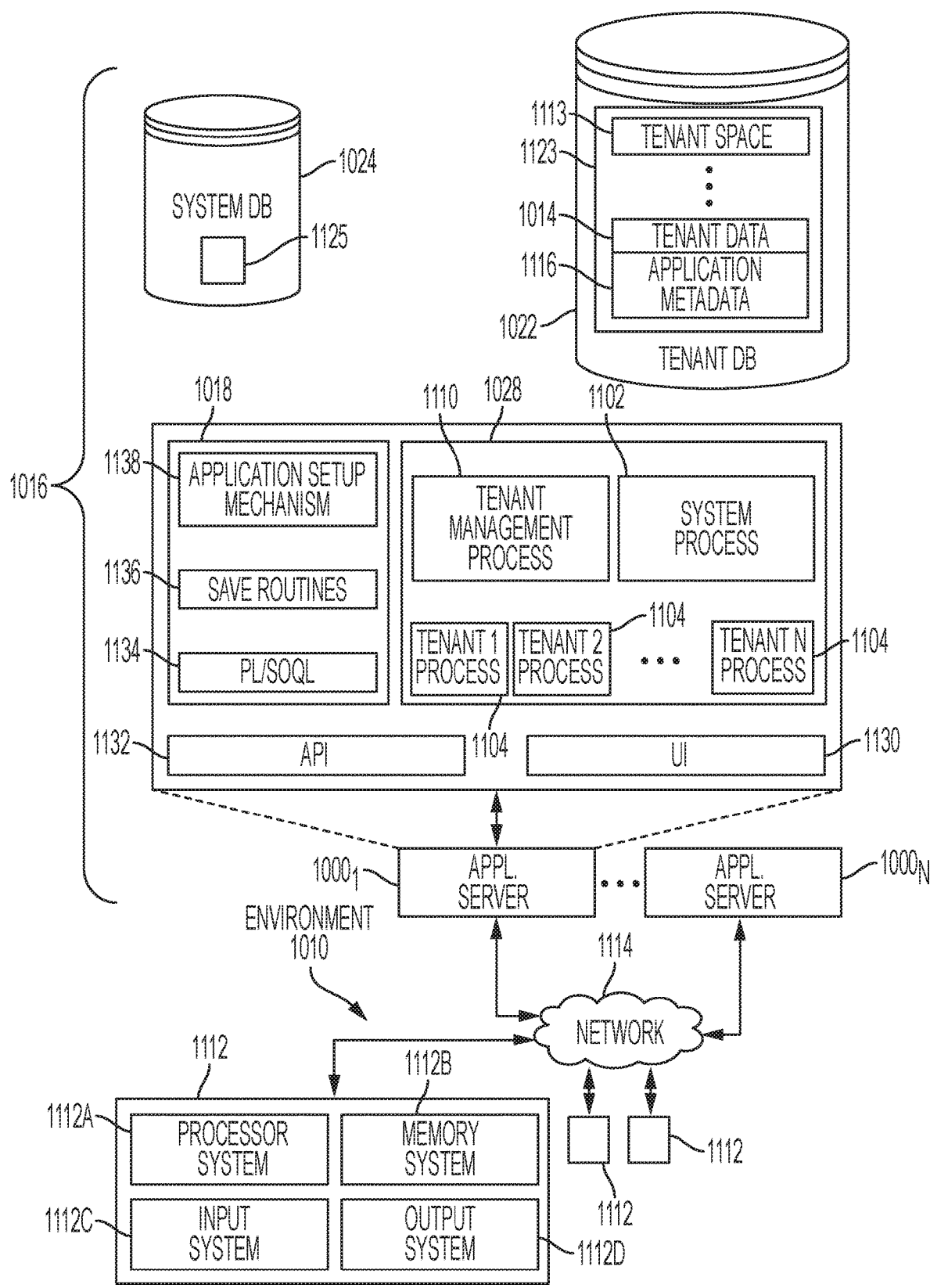
FIG. 11 shows a block diagram of example implementations of elements of FIG. 10 and example interconnections between these elements according to some implementations.

FIG. 11 shows a block diagram of example implementations of elements of FIG. 10 and example interconnections between these elements according to some implementations. That is, FIG. 11 also illustrates environment 1010, but FIG. 11, various elements of the system 1016 and various interconnections between such elements are shown with more specificity according to some more specific implementations. Elements from FIG. 10 that are also shown in FIG. 11 will use the same reference numbers in FIG. 11 as were used in FIG. 10. Additionally, in FIG. 11, the user system 1012 includes a processor system 1112A, a memory system 1112B, an input system 1112C, and an output system 1112D. The processor system 1112A can include any suitable combination of one or more processors. The memory system 1112B can include any suitable combination of one or more memory devices. The input system 1112C can include any suitable combination of input devices, such as one or more touchscreen interfaces, keyboards, mice, trackballs, scanners, cameras, or interfaces to networks. The output system 1112D can include any suitable combination of output devices, such as one or more display devices, printers, or interfaces to networks.

In FIG. 11, the network interface 1020 of FIG. 10 is implemented as a set of HTTP application servers 11001-1100N. Each application server 1100, also referred to herein as an "app server," is configured to communicate with tenant database 1022 and the tenant data 1123 therein, as well as system database 1024 and the system data 1125 therein, to serve requests received from the user systems 1112. The tenant data 1123 can be divided into individual tenant storage spaces 1113, which can be physically or logically arranged or divided. Within each tenant storage space 1113, tenant data 1114 and application metadata 1116 can similarly be allocated for each user. For example, a copy of a user's most recently used (MRU) items can be stored to tenant data 1114. Similarly, a copy of MRU items for an entire organization that is a tenant can be stored to tenant storage space 1113.

The process space 1028 includes system process space 1102, individual tenant process spaces 1104 and a tenant management process space 1110. The application platform 1018 includes an application setup mechanism 1138 that supports application developers' creation and management of applications. Such applications and others can be saved as metadata into tenant database 1022 by save routines 1136 for execution by subscribers as one or more tenant process spaces 1104 managed by tenant management process 1110, for example. Invocations to such applications can be coded using PL/SOQL 1134, which provides a programming language style interface extension to API 1132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 1116 for the subscriber making the invocation and executing the metadata as an application in a virtual machine.

The system 1016 of FIG. 11 also includes a user interface (UI) 1130 and an application programming interface (API) 1132 to system 1016 resident processes to users or developers at user systems 1112. In some other implementations, the environment 1010 may not have the same elements as those listed above or may have other elements instead of, or in addition to, those listed above.

Each application server 1100 can be communicably coupled with tenant database 1022 and system database 1024, for example, having access to tenant data 1123 and system data 1125, respectively, via a different network connection. For example, one application server 11001 can be coupled via the network 1014 (for example, the Internet), another application server 1100N can be coupled via a direct network link, and another application server (not illustrated) can be coupled by yet a different network connection. Transfer Control Protocol and Internet Protocol (TCP/IP) are examples of typical protocols that can be used for communicating between application servers 1100 and the system 1016. However, it will be apparent to one skilled in the art that other transport protocols can be used to optimize the system 1016 depending on the network interconnections used.

In some implementations, each application server 1100 is configured to handle requests for any user associated with any organization that is a tenant of the system 1016. Because it can be desirable to be able to add and remove application servers 1100 from the server pool at any time and for various reasons, in some implementations there is no server affinity for a user or organization to a specific application server 1100. In some such implementations, an interface system implementing a load balancing function (for example, an F5 Big-IP load balancer) is communicably coupled between the application servers 1100 and the user systems 1112 to distribute requests to the application servers 1100. In one implementation, the load balancer uses a least-connections algorithm to route user requests to the application servers 1100. Other examples of load balancing algorithms, such as round robin and observed-response-time, also can be used. For example, in some instances, three consecutive requests from the same user could hit three different application servers 1100, and three requests from different users could hit the same application server 1100. In this manner, by way of example, system 1016 can be a multi-tenant system in which system 1016 handles storage of, and access to, different objects, data and applications across disparate users and organizations.

In one example storage use case, one tenant can be a company that employs a sales force where each salesperson uses system 1016 to manage aspects of their sales. A user can maintain contact data, leads data, customer follow-up data, performance data, goals and progress data, etc., all applicable to that user's personal sales process (for example, in tenant database 1022). In an example of an MTS arrangement, because all of the data and the applications to access, view, modify, report, transmit, calculate, etc., can be maintained and accessed by a user system 1112 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 1016 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 1016 also can maintain system level data usable by multiple tenants or other data. Such system level data can include industry reports, news, postings, and the like that are sharable among tenants.

In some implementations, the user systems 1112 (which also can be client systems) communicate with the application servers 1100 to request and update system-level and tenant-level data from the system 1016. Such requests and updates can involve sending one or more queries to tenant database 1022 or system database 1024. The system 1016 (for example, an application server 1100 in the system 1016) can automatically generate one or more SQL statements (for example, one or more SQL queries) designed to access the desired information. System database 1024 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 12:
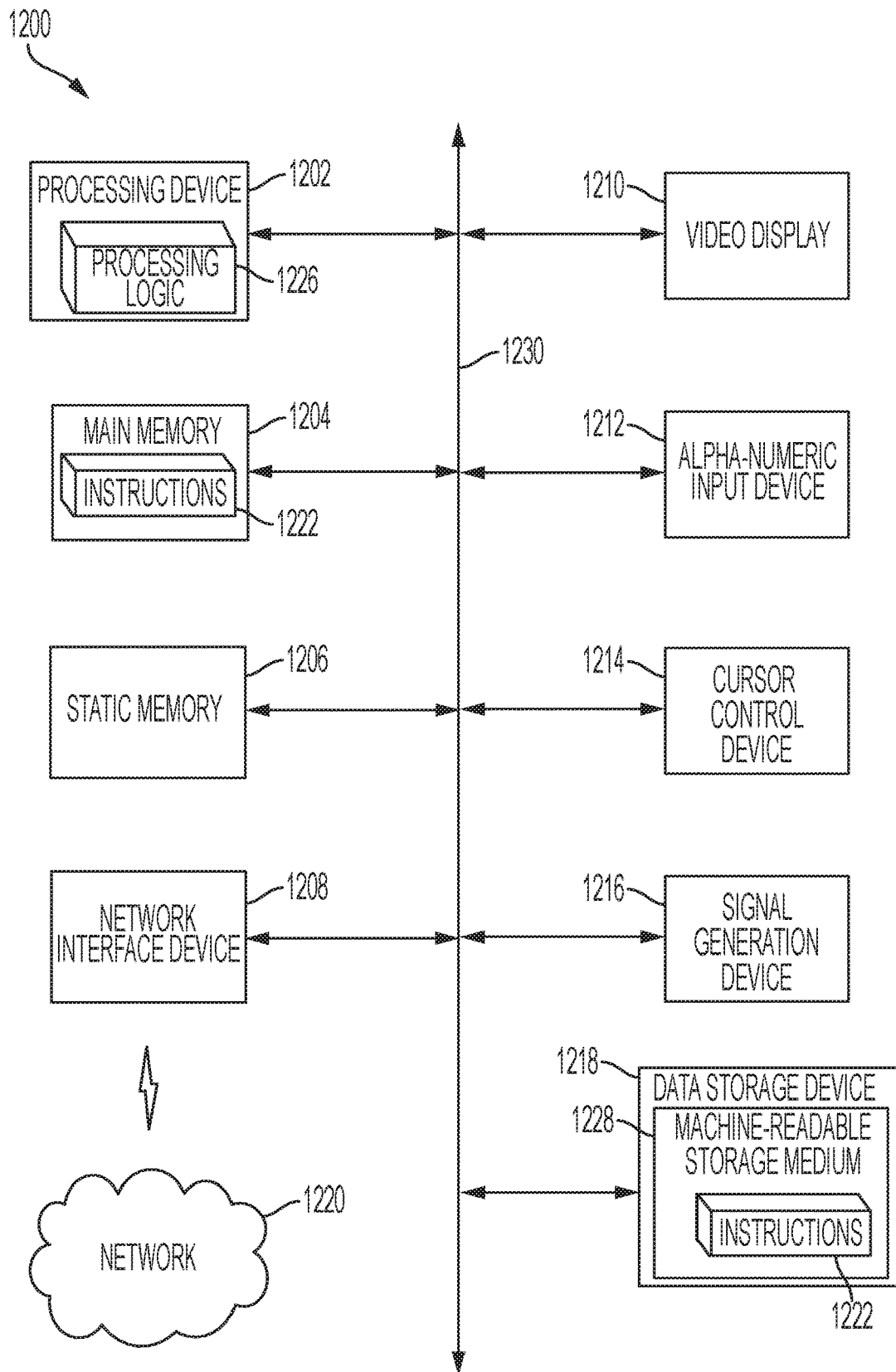
FIG. 12 is a block diagram that illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may represent, for example, elements of the cloud computing platform 102 of FIG. 1 (e.g. clients 110, the payments platform 126 and/or the a multi-tenant database system 120), the payment gateways 140 of FIG. 1, computing systems used by the customers 150 of FIG. 1, the third-party application exchange 160 of FIG. 1, the user systems 940 of FIG. 9, the server system 902 of FIG. 9, or the database system 930 of FIG. 9, etc.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of in-memory buffer service 124) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A payment transaction method for integrating payment gateways with a cloud computing platform so that clients of the cloud computing platform can perform payment transactions with customers using the payment gateways via the cloud computing platform, the payment transaction method comprising:

receiving, at a payments platform, a payment request from a particular client of the clients of the cloud computing platform;

initializing and calling a particular payment gateway adapter of a plurality of payment gateway adapters to send the payment request to the particular payment gateway adapter, wherein the particular payment gateway adapter corresponds to a particular payment gateway of a plurality of payment gateways;

transforming, at the particular payment gateway adapter, the payment request into a gateway specific format of the particular payment gateway to generate a transformed payment request;

performing internal processing at the payments platform and calling the particular payment gateway via the particular payment gateway adapter to send the transformed payment request to the particular payment gateway;

receiving the transformed payment request at the particular payment gateway; processing the transformed payment request at the particular payment gateway to generate an actual payment response and sending the actual payment response from the particular payment gateway to the payments platform;

forwarding the actual payment response from the payments platform to the particular payment gateway adapter;

transforming, at the particular payment gateway adapter, the actual payment response into a specific format used by the payments platform to generate a transformed payment response;

and sending the transformed payment response from the particular payment gateway adapter to the payments platform; and persisting, via the payments platform, data from the transformed payment response in a payment record at a database system of the cloud computing platform, wherein the data is persisted in a pending state.

2. The method according to claim 1, further comprising: after persisting the data:
sending an appropriate response to the particular client from the payments platform that includes an indication of whether the transformed payment response was successful or unsuccessful.

3. The method according to claim 1, further comprising:
prior to initializing and calling the particular payment gateway adapter: validating the payment request at the payments platform to determine whether the payment request is valid.

4. The method according to claim 3, further comprising:
when the payments platform determines that the payment request is valid: validating, at a payment gateway integration layer, a specific configuration of the particular payment gateway to determine whether the specific configuration is valid; and
wherein initializing and calling the particular payment gateway adapter, comprises:
initializing and calling the particular payment gateway adapter of the plurality of payment gateway adapters when the payment gateway integration layer determines that the specific configuration of the particular payment gateway is valid.

5. The method according to claim 4, further comprising:
when the payments platform determines that the payment request is not valid, or when the payment gateway integration layer determines that the specific configuration of the particular payment gateway is not valid:
generating, at the payments platform, an appropriate error response; and
sending the appropriate error response to the particular client, wherein the appropriate error response indicates either: why the payment request was not valid or why the specific configuration of the particular payment gateway was not valid.

6. The method according to claim 4, further comprising:
validating, at the particular payment gateway adapter, request data from the payment request to determine whether the request data is valid; and
wherein transforming, at the particular payment gateway adapter, the payment request into the gateway specific format of the particular payment gateway comprises:
transforming, at the particular payment gateway adapter when the particular payment gateway adapter determines that the request data from the payment request is valid, the payment request into the gateway specific format of the particular payment gateway.

7. The method according to claim 6, further comprising:
when the particular payment gateway adapter determines that the request data from the payment request is not valid: sending, from the particular payment gateway adapter to the payments platform, a response that indicates that the request data from the payment request is not valid;
determining at the payments platform whether a gateway call was successful; and
sending an appropriate response to the particular client from the payments platform that includes an indication of that the transformed payment response was successful or unsuccessful.

8. The method according to claim 7, further comprising:
generating, at the payments platform when the gateway call was determined to be unsuccessful, an appropriate error response; and sending the appropriate error response to the particular client, wherein the appropriate error response indicates why the gateway call was not successful.

9. The method according to claim 1, further comprising:
after sending the transformed payment request to the payments platform: creating, at the payments platform, a payment gateway log record that comprises: gateway log details including data from the transformed payment request and a payment gateway ID.

10. The method according to claim 1, further comprising:
after receiving the transformed payment response at the payments platform:
evaluating the transformed payment response at the payments platform to determine whether the transformed payment response was successful or unsuccessful;
creating a payment record having a status of processed when the transformed payment response was determined to be successful; and
responding back to the particular client with at least gateway log details and payment record details.

11. The method according to claim 1, wherein the payment record includes financial details related to a payment, comprising: an amount of the payment, details regarding a payment method, payment type, transaction date, and an identifier for the particular payment gateway that was used to make the payment.

12. The method according to claim 1, wherein the particular payment gateway is a particular synchronous payment gateway that processes the transformed payment request synchronously by: processing the transformed payment request to generate the actual payment response and then sending the actual payment response to the payments platform during the same interaction such that the actual payment response is deterministic.

13. A cloud-based computing system, the cloud-based computing system comprising:
a plurality of payment gateways comprising a particular payment gateway;
a cloud computing platform, comprising:
a multitenant database system that is configurable to provide applications and services to a plurality of clients, wherein each client is a tenant or organization of the cloud computing platform; and
a payments platform for integrating the plurality of payment gateways with the cloud computing platform so that the plurality of clients can perform payment transactions with customers using the plurality of payment gateways via the cloud computing platform, wherein the payments platform, when executed by a first hardware-based processing system, is configurable to cause:
receiving a payment request from a particular client of the plurality of clients;
initializing and calling a particular payment gateway adapter of a plurality of payment gateway adapters to send the payment request to the particular payment gateway adapter, wherein the particular payment gateway adapter corresponds to the particular payment gateway of the plurality of payment gateways;
transforming, at the particular payment gateway adapter, the payment request into a gateway specific format of the particular payment gateway to generate a transformed payment request;
performing internal processing at the payments platform and calling the particular payment gateway via the particular payment gateway adapter to send the transformed payment request to the particular payment gateway;

wherein the particular payment gateway, when executed by a second hardware-based processing system, is configurable to cause:

receiving the transformed payment request; processing the transformed payment request to generate an actual payment response and sending the actual payment response to the payments platform;

wherein the payments platform, when executed by the first hardware-based processing system, is further configurable to cause:

forwarding the actual payment response to the particular payment gateway adapter; transforming, at the particular payment gateway adapter, the actual payment response into a specific format used by the payments platform to generate a transformed payment response; and sending the transformed payment response from the particular payment gateway adapter to the payments platform; and persisting data from the transformed payment response in a payment record at the multitenant database system of the cloud computing platform.

14. The cloud-based computing system according to claim 13, wherein the payment record includes financial details related to a payment, comprising: an amount of the payment, details regarding a payment method, payment type, transaction date, and an identifier for the particular payment gateway that was used to make the payment.

15. The cloud-based computing system according to claim 13, wherein the particular payment gateway is a particular synchronous payment gateway that processes the transformed payment request synchronously by: processing the transformed payment request to generate the actual payment response and then sending the actual payment response to the payments platform during the same interaction such that the actual payment response is deterministic.

* * * * *